United States Patent
Pearcy et al.

(10) Patent No.: US 9,127,122 B2
(45) Date of Patent: *Sep. 8, 2015

(54) COPOLYESTERS CONTAINING NEOPENTYL GLYCOL AND 2,2,4,4-TETRAALKYL 1,3-CYCLOBUTANEDIOL

(71) Applicant: EASTMAN CHEMICAL COMPANY, Kingsport, TN (US)

(72) Inventors: Barry Glen Pearcy, Mount Carmel, TN (US); Jonathan Terrill Milburn, Kingsport, TN (US); Alan Wayne White, Kingsport, TN (US)

(73) Assignee: EASTMAN CHEMICAL COMPANY, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/136,170

(22) Filed: Dec. 20, 2013

(65) Prior Publication Data
US 2014/0113094 A1    Apr. 24, 2014

Related U.S. Application Data

(63) Continuation-in-part of application No. 13/658,233, filed on Oct. 23, 2012, now Pat. No. 8,623,483.

(51) Int. Cl.
*C08G 63/199* (2006.01)
*C08G 63/83* (2006.01)
*C08G 63/84* (2006.01)
*C08G 63/85* (2006.01)

(52) U.S. Cl.
CPC .............. *C08G 63/199* (2013.01); *C08G 63/83* (2013.01); *C08G 63/84* (2013.01); *C08G 63/85* (2013.01); *Y10T 428/1397* (2015.01)

(58) Field of Classification Search
CPC .......... B29D 22/00; B29D 23/00; B23B 1/08; C08L 67/00; C08L 67/02; C08G 63/02; C08G 63/12; C08G 63/16; C08G 63/199; C08G 63/83; C08G 63/84; C08G 63/85; C08J 5/00; Y10T 428/1397
USPC ............. 428/35.7, 36.9, 480; 528/308, 308.6, 528/308.7
See application file for complete search history.

(56) References Cited

U.S. PATENT DOCUMENTS

| | | |
|---|---|---|
| 2,060,412 A | 11/1936 | Hermann et al. |
| 2,133,594 A | 10/1938 | Dario |
| 2,402,196 A | 6/1946 | Zeek |
| 2,720,507 A | 10/1955 | Caldwell |
| 3,772,405 A | 11/1973 | Hamb |
| 5,989,663 A | 11/1999 | Morris et al. |
| 6,005,059 A | 12/1999 | Scott et al. |
| 7,781,562 B2 | 8/2010 | Crawford et al. |
| 8,623,483 B1 | 1/2014 | Pearcy et al. |

FOREIGN PATENT DOCUMENTS

| | | |
|---|---|---|
| GB | 469422 | 7/1937 |
| GB | 1 044 015 A | 9/1966 |
| WO | WO 2010/090715 A1 | 8/2010 |

OTHER PUBLICATIONS

Notification of transmittal of the International Search Report and the written opinion of the International Searching Authority or the declaration date of mailing Jan. 14, 2014, received in International Application No. PCT/US2013/066027, Filing Date: Oct. 22, 2013.

Favrel, G., Preparation of azo compounds of alkylacetylacetones, Compt. Rend. (1929), 189, 335-3374.

Goetzel, Claus G., Metal working in powder metallurgy. II. Industrial practices in the sintered refractory metal field, Wire and Wire Products (1943), 18, 394-395, 247 (Journal) ISSN No. 0043-6003.

Dunn, Max, The Liberation of Carbon Dioxide, Ammonia and Amino Nitrogen from Casein by Acid Hydrolysis, Chemical Laboratory, University of California, Southern Branch, Published Oct. 6, 1925, pp. 2564-2568, vol. 47.

Chambers, Robert and Scherer, Philip, Phenyitin Compounds, Contribution from the Jesse Metcalf Chemical Laboratory of Brown University, Published Apr. 5, 1926, pp. 1054-1062, vol. 48.

Krause , Erich, and Grosse, A.V., Recent Books, Die Chemie Der Metall—Organischen Verbindungen, pp. 148, 1937, Gobroder-Borntrager.

Lay, Douglas, Aiken Lake area, north-central British Columbia, No. 1, pp. 32, (Journal), ISSN No. 0365-9364.

ASTM International, Standard Test Methods for Determining Inherent Viscosity of Poly(Ethylene Terephthalate) (PET) by Glass Capillary Viscometer, D4603-03, Reapproved with editorial changes Nov. 2011.

Bullard, Ralph and Robinson, Wade, Methylphenyl-Stannanes, Contribution from the Chemical Laboratory of Hobart College, Published May 10, 1927, pp. 1368-1373, vol. 49.

*Primary Examiner* — Michael C Miggins
(74) *Attorney, Agent, or Firm* — Betty J. Boshears

(57) ABSTRACT

There is provided an article comprising a copolyester containing residues of neopentyl glycol, 2,2,4,4-tetraalkyl 1,3-cyclobutanediol such as 2,2,4,4-tetramethyl 1,3-cyclobutanediol, tin atoms, aluminum atoms, an alkali or alkaline earth metal atoms such as lithium atoms, optionally phosphorus atoms, and having an It.V. of at least 0.55 dL/g, and Tg of at least 90° C. Such higher It.V. copolyesters can now be made having high Tg, good thermal stability, and higher insertion of 2,2,4,4-tetraalkyl 1,3-cyclobutanediol.

44 Claims, No Drawings

COPOLYESTERS CONTAINING NEOPENTYL GLYCOL AND 2,2,4,4-TETRAALKYL 1,3-CYCLOBUTANEDIOL

CROSS REFERENCE TO RELATED APPLICATIONS

This application is a continuation-in-part of copending U.S. application Ser. No. 13/658,233, filed Oct. 23, 2012, currently pending, which is hereby incorporated by reference in its entirety.

FIELD OF THE INVENTION

The present invention relates to copolyesters containing residues of neopentyl glycol and 2,2,4,4-tetramethyl-1,3-cyclobutanediol having high intrinsic viscosity and thermal stability.

BACKGROUND OF THE INVENTION

High molecular weight copolyesters containing both neopentyl glycol (NPG) and 2,2,4,4-tetramethyl 1,3-cyclobutanediol (TMCD) are difficult to prepare using conventional catalysts (e.g. titanium and/or tin) and polymerization conditions. TMCD can increase the glass transition temperature (Tg) in copolyesters made from dimethyl terephthalate (DMT).

Producing an amorphous copolyester having a high Tg is desirable for certain end use applications where the polymer must remain dimensionally stable under heat. While TMCD can raise the Tg of an amorphous copolyester, it becomes difficult to insert TMCD residues into the backbone of the copolyester in the melt phase polycondensation to produce a polymer with high Tg. Using an excess of TMCD to incorporate the desired amount of TMCD into the backbone of the copolyester results in increased costs for use of the excess TMCD.

However, a polyester made using only TMCD as the glycol has such a high melt viscosity that it is difficult to make and process. Therefore, other glycol comonomers are used to lower the melt viscosity of the polymer melt and to also improve other properties such as toughness. One glycol that has been used is 1,4-cyclohexanedimethanol (CHDM). Copolyesters made from DMT, CHDM and TMCD have had commercial success, but can suffer from decreased thermal stability due to degradation reactions with the CHDM component, meaning that the polymer loses molecular weight during high temperature processing of the polymer in melt extrusion. Furthermore, high processing temperatures during the manufacture of the polymer, especially in the final polymerization reactor, also called the finisher, are desirable to produce polymers from the melt that have a high molecular weight, typically measured as the polymer's intrinsic viscosity (It.V). However, a polymer with poor thermal stability at the finisher reaction temperatures makes it difficult to adequately build the IV (0.55 dL/g or more) needed for many end use applications.

Thus, there remains a need to develop a copolyester containing TMCD that has a good balance of high Tg (at least 90° C.), good IV (0.55 dL/g or more), has an acceptable level of TMCD incorporation into the backbone of the copolyester polymer, and has good thermal stability.

SUMMARY OF THE INVENTION

There is now provided an amorphous copolyester composition comprising:

a) residues of 2,2,4,4-tetraalkyl-1,3-cyclobutanediol (TACD);
b) residues of neopentyl glycol (NPG);
c) alkali metal atoms or alkaline earth metal atoms;
d) aluminum atoms;
e) tin atoms;
f) an IV of at least 0.55 dL/g; and
g) a Tg of at least 90° C.

There is now also provided a process for making a copolyester composition comprising:

a) polycondensing a copolyester melt, comprising residues of NPG and residues of TACD, to an IV of at least 0.55 dL/g in the presence of an alakali or alkaline earth metal catalyst, an aluminum catalyst, and a tin catalyst to obtain a high IV copolyester melt; and
b) converting the high IV copolyester melt into amorphous copolyester particles having a Tg of a least 90° C.

There is also provided a process for making a copolyester composition comprising:

a) polycondensing a copolyester melt, comprising residues of NPG and residues of TACD and residues of a tin catalyst, to an IV of at least 0.55 dL/g in at a temperature of at least 275° C.; and
b) converting the high IV copolyester melt into amorphous copolyester particles having a Tg of a least 90° C. and which is thermally stable defined as having an average molecular weight (Mw) of 15,000 or greater measured by melting a dried sample (dried at 80° C. for at least 24 hours) of copolyester in a nitrogen atmosphere at 310° C. for 25 minutes and determining its Mw molecular weight at that point by Gel Permeation Chromatography ("GPC").

DETAILED DESCRIPTION OF THE INVENTION

The present invention may be understood more readily by reference to the following detailed description of the invention.

As used in the specification and the appended claims, the singular forms "a," "an" and "the" include plural referents unless the context clearly dictates otherwise. For example, reference to processing or making a "polymer," a "preform," "article," "container," or "bottle" is intended to include the processing or making of a plurality of polymers, preforms, articles, containers or bottles.

References to a composition containing "an" ingredient or "a" polymer is intended to include other ingredients or other polymers, respectively, in addition to the one named.

By "comprising" or "containing" or "having" is meant that at least the named compound, element, particle, or method step etc. must be present in the composition or article or method, but does not exclude the presence of other compounds, catalysts, materials, particles, method steps, etc., even if the other such compounds, material, particles, method steps etc. have the same function as what is named, unless expressly excluded in the claims.

It is also to be understood that the mention of one or more method steps does not preclude the presence of additional method steps before or after the combined recited steps or intervening method steps between those steps expressly identified. Moreover, the lettering of process steps is a convenient means for identifying discrete activities or steps, and unless otherwise specified, recited process steps can be arranged in any sequence.

Expressing a range includes all integers and fractions thereof within the range. Expressing a range also includes the end points of the range regardless of whether the range is referred to a number "within" or "between" or "of" certain expressed numbers. The ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10.

Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Expressing a temperature or a temperature range in a process, or of a reaction mixture, or of a melt or applied to a melt, or of a polymer or applied to a polymer means in all cases that the limitation is satisfied if either the applied temperature, the actual temperature of the melt or polymer, or both are at a value within the specified range, continuously or intermittently.

The word "composition" means a single ingredient or polymer or multiple ingredients or polymers. Each listed ingredient is present in the composition, and the composition may contain any number and types of other unspecified ingredients or polymers. A composition does not imply that an ingredient in the composition is unbound or unreacted. The composition may be solid or liquid. The stated ingredients in the composition may be bound, unbound, reacted, unreacted, and unless otherwise specified, in any oxidation state.

By "atoms" as used in conjunction with a metal is meant the metal atom occupying any oxidation state, any morphological state, any structural state, and any chemical state, whether as added to or as present in the polymer or composition of matter.

The term "polyester", as used herein, is intended to include "copolyesters" and is understood to mean a synthetic polymer prepared by the polycondensation of one or more difunctional carboxylic acids and two more difunctional hydroxyl compounds. Typically the difunctional carboxylic acid is a dicarboxylic acid and the difunctional hydroxyl compound is a dihydric alcohol such as, for example, glycols and diols.

The term "residue", as used herein, means any organic structure incorporated into a polymer through a polycondensation reaction involving the corresponding monomer. The term "repeating unit", as used herein, means an organic structure having a dicarboxylic acid residue and a diol residue bonded through a carbonyloxy group. Thus, the dicarboxylic acid residues may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make high molecular weight copolyester.

The copolyester polymer of this invention is any thermoplastic copolyester polymer in any state (e.g. solid or molten), and in any shape, each as the context in which the phrase is used dictates, and includes the composition of matter resulting from the melt phase, or the composition of matter in a melt extrusion zone, or articles made from the copolyester, such as injection molded articles, injection blow molded articles, injection stretch blow molded articles, extruded film, extruded sheet, extrusion blow molded articles, and fibers.

The copolyester polymer is any thermoplastic copolyester polymer. Copolyester thermoplastic polymers of the invention are distinguishable from liquid crystal polymers and thermosetting polymers in that thermoplastic polymers have no appreciable ordered structure while in the liquid (melt) phase, they can be remelted and reshaped into a molded article, and liquid crystal polymers and thermosetting polymers are unsuitable for the intended applications such as packaging or stretching in a mold to make a container.

The copolyester polymer is desirably a random polymer such that the monomer units in the polymer chain are randomly arranged rather than arranged in an ordered block fashion.

The term "melt phase polymerization" is a broad umbrella term referring to a stream undergoing reaction at any point in the melt phase for making a copolyester polymer, and includes the composition in the first esterification vessel and anywhere in the esterification phase even though the viscosity of the stream at this stage is typically not measurable or meaningful, and also includes the stream in the polycondensation phase including the prepolymer and finishing phases, in-between each phase, and less than the point where the melt is solidified, and excludes a copolyester polymer undergoing an increase in molecular weight in the solid state.

The copolyesters of this invention can be amorphous or semi-crystalline depending on the type and amounts of monomers used. In one aspect, certain polyesters useful in the invention can have substantially amorphous morphology, meaning that the polyesters comprise substantially un-ordered regions of polymer. Amorphous copolyesters generally do not have melting points.

The "bulk" of copolyester particles is defined as an accumulation of particles which together weigh at least 500 kg. A bulk having a defined characteristic can be determined by taking a random sampling of 10 particles from the bulk for analysis. When it is said that a bulk of copolyester exhibit the characteristics expressed herein, it is meant that a random sampling of 10 or more particles taken from the bulk exhibit an average of a defined characteristic determined by the suitable analysis. As in any manufacturing process, it is possible to obtain anomalous particles which exhibit characteristics either inside or outside of those stated herein. The particles of the invention, however, exhibit the stated characteristics across a bulk, and these characteristics can be measured by taking a random sampling of at least ten particles and determining the stated characteristics as an average across the ten particles. All ten particles may be measured together in one analysis, or each particle may be separately analyzed.

The bulk of copolyester polymer particles are desirably packaged into a container. Examples of suitable containers to hold the particles are storage silos to hold the particles while they await shipment from one location to another. Another example of a container is a dryer hopper attached to an extruder or injection molding machine. Another example of a container to hold the particles is a shipping container, such as a Gaylord box, a crate, a railcar, a trailer that can be attached to a truck, a drum, a cargo hold on a ship, or any other suitable package used to transport particles. Thus, there are provided containers with particles which are finished and ready for shipment or in shipment to a customer for converting the pellets to an article. The particles have been subjected by the particle manufacturer to all the processing conditions needed to produce a particle with characteristics acceptable to its customers who convert the pellets to articles. In the embodiment where the pellets may occupy a dryer hopper, the converter of pellets places the bulk of the pellets into the dryer hopper and removes residual moisture from the pellets to prevent excessive IV degradation during melt processing.

In a preferred embodiment, the copolyester composition, or the bulk of particles, are not solid state polymerized. For example, there is provided a bulk of particles in a container, most preferably a shipping container, which have not been solid state polymerized, meaning their molecular weight has not been increased in the solid state by more than 0.05 dL/g. Desirably, their molecular weight has not been increased in the solid state by more than 0.02 dL/g, or even 0.01 dL/g.

The copolyester polymer particles are solid at 25° C. and 1 atmosphere.

The amorphous copolyester polymers, and the composition, of the invention exhibit a glass transition temperature (abbreviated herein as "Tg") of at least 90° C., as measured by well-known techniques such as, for example, differential scanning calorimetry ("DSC") using a TA DSC 2920 from TA Instruments at a scan rate of 20° C./min.

Desirably, the Tg of the amorphous copolyesters exhibit a Tg of at least 92° C., or at least 94° C., or at least 96° C., or at least 98° C., or at least 100° C., or at least 102° C., or at least 104° C., or at least 106° C., or at least 108° C., or at least 110° C., or at least 112° C., or at least 144° C., or at least 116° C., or at least 118° C., or at least 120, and up to 185° C., or up to less than 170° C., or up to 160° C., or less than 150° C., or less than 140° C., or less than 138° C., or less than 136° C., or less than 134° C., or less than 132° C., or less than 130° C., or less than 128° C., or less than 126° C., or less than 124° C., or less than 122° C., or less than 120° C., or less than 118° C., or less than 116° C.

Exemplary ranges include a Tg in a range of 90 to 185C; 90 to 180° C.; 90 to 170° C.; 90 to 160° C.; 90 to 155° C.; 90 to 150° C.; 90 to 145° C.; 90 to 140° C.; 90 to 138° C.; 90 to 135° C.; 90 to 130° C.; 90 to 125° C.; 90 to 120° C.; 90 to 115° C.; 90 to 110° C.; 90 to 105° C.; 90 to 100° C.; 90 to 95° C.; 92 to 185° C.; 92 to 180° C.; 92 to 170° C.; 92 to 160° C.; 92 to 155° C.; 92 to 150° C.; 92 to 145° C.; 92 to 140° C.; 92 to 138° C.; 92 to 136° C.; 92 to 134° C.; 92 to 132° C.; 92 to 130° C.; 92 to 128° C.; 92 to 126° C.; 92 to 124° C.; 100 to 185° C.; 100 to 160° C.; 100 to 150° C.; 100 to 145° C.; 100 to 140° C.; 100 to 138° C.; 100 to 136° C.; 100 to 134° C.; 100 to 132° C.; 100 to 130° C.; 100 to 128° C.; 100 to 126° C.; 105 to 185° C.; 105 to 160° C.; 105 to 150° C.; 105 to 145° C.; 105 to 140° C.; 105 to 136° C.; 105 to 132° C.; 105 to 128° C.; 110 to 185° C.; 110 to 160° C.; 110 to 150° C.; 110 to 145° C.; 110 to 140° C.; 110 to 136° C.; 110 to 132° C.; and 110 to 128° C.

The IV referred to throughout means the intrinsic viscosity It.V. Where the IV refers to inherent viscosity it is referred to expressly as Ih.V.

The It.V. of the copolyester composition, and the copolyester polymers, is at least 0.55 dL/g. For example, the It.V. of the copolyester particles can be at least 0.58 dL/g, or at least 0.60 dL/g, or at least 0.62 dL/g, or at least 0.64 dL/g, or at least 0.65 dL/g, or at least 0.67 dL/g, or at least 0.69 dL/g, or at least 0.70 dL/g, or at least 0.72 dL/g, or at least 0.74 dL/g, or at least 0.75 dL/g, or at least 0.77 dL/g, or at least 0.79 dL/g, or at least 0.80 dL/g, or at least 0.82 dL/g, and less than 0.85 dL/g, or less than 0.82 dL/g, or less than 0.80 dL/g, or less than 0.78 dL/g, or less than 0.75 dL/g, or less than 0.72 dL/g, or no more than 0.68 dL/g, or no more than 0.65 dL/g, or no more than 0.63 dL/g, or no more than 0.60 dL/g, or no more than 0.58 dL/g. Examples of ranges include 0.55 to 0.85 dL/g; 0.55 to 0.82 dL/g; 0.55 to 0.80 dL/g; 0.55 to 0.75 dL/g; 0.55 to less than 0.75 dL/g; 0.55 to 0.72 dL/g; 0.55 to 0.70 dL/g; 0.55 to less than 0.70 dL/g; 0.55 to 0.68 dL/g; 0.55 to less than 0.68 dL/g; 0.55 to 0.67 dL/g; 0.55 to 0.65 dL/g; 0.55 to 0.63 dL/g; 0.55 to 0.60 dL/g; 0.55 to 0.58 dL/g; 0.58 to 0.85 dL/g; 0.58 to 0.80 dL/g; 0.58 to 0.75 dL/g; 0.58 to less than 0.75 dL/g; 0.58 to 0.72 dL/g; 0.58 to 0.70 dL/g; 0.58 to less than 0.70 dL/g; 0.58 to 0.68 dL/g; 0.58 to 0.65 dL/g; 0.60 to 0.85 dL/g; 0.60 to 0.80 dL/g; 0.60 to 0.75 dL/g; 0.60 to less than 0.75 dL/g; 0.60 to 0.72 dL/g; 0.60 to 0.70 dL/g; 0.60 to less than 0.70 dL/g; 0.60 to 0.68 dL/g; 0.60 to less than 0.68 dL/g; 0.60 to 0.65 dL/g; 0.60 to 0.64 dL/g; 0.60 to 0.68 dL/g; 0.64 to 0.85 dL/g; 0.64 to 0.80 dL/g; 0.64 to 0.75 dL/g; 0.64 to less than 0.75 dL/g; 0.64 to 0.72 dL/g; 0.64 to 0.70 dL/g; 0.64 to less than 0.70 dL/g; 0.67 to 0.85 dL/g; 0.67 to 0.80 dL/g; 0.67 to 0.75 dL/g; 0.67 to less than 0.75 dL/g; 0.67 to 0.72 dL/g; 0.69 dL/g to 0.85 dL/g; 0.69 dL/g to 0.82 dL/g; 0.69 dL/g to 0.80 dL/g; 0.69 dL/g to 0.75 dL/g; 0.69 dL/g to 0.72 dL/g; 0.72 dL/g to 0.85 dL/g; and 0.72 dL/g to 0.82.

The intrinsic viscosity values described throughout this description are set forth in dL/g units as calculated from the inherent viscosity measured at 25° C. in 60/40 wt/wt phenol/tetrachloroethane at a concentration of 0.25 g/50 mL. We measure intrinsic viscosity according to ASTM D4603, with the exception that we prepare and measure the solution at 25° C. instead of 30° C.

The inherent viscosity (Ih.V.) of the copolyester composition, and the copolyester polymers, is at least 0.50 dL/g. For example, the Ih.V. of the copolyester particles can be at least 0.50 dL/g, or at least 0.53 dL/g, or at least 0.55 dL/g, or at least 0.57 dL/g, or at least 0.60 dL/g, or at least 0.62 dL/g, or at least 0.64 dL/g, or at least 0.65 dL/g, or at least 0.67 dL/g, or at least 0.69 dL/g, or at least 0.70 dL/g, or at least 0.72 dL/g, or at least 0.74 dL/g; and up to 0.83 dL/g, or less than 0.82 dL/g, or less than 0.80 dL/g, or less than 0.78 dL/g, or less than 0.75 dL/g, or less than 0.72 dL/g. Examples of ranges include 0.50 to 0.83 dL/g; 0.50 to 0.82 dL/g; 0.50 to 0.80 dL/g; 0.50 to 0.75 dL/g; 0.50 to less than 0.75 dL/g; 0.50 to 0.72 dL/g; 0.50 to 0.70 dL/g; 0.50 to less than 0.70 dL/g; 0.50 to 0.68 dL/g; 0.50 to less than 0.68 dL/g; 0.50 to 0.67 dL/g; 0.50 to 0.65 dL/g; 0.58 to 0.83 dL/g; 0.58 to 0.80 dL/g; 0.58 to 0.75 dL/g; 0.58 to less than 0.75 dL/g; 0.58 to 0.72 dL/g; 0.58 to 0.70 dL/g; 0.58 to less than 0.70 dL/g; 0.58 to 0.68 dL/g; 0.58 to less than 0.68 dL/g; 0.58 to 0.65 dL/g; 0.60 to 0.83 dL/g; 0.60 to 0.80 dL/g; 0.60 to 0.75 dL/g; 0.60 to less than 0.75 dL/g; 0.60 to 0.72 dL/g; 0.60 to 0.70 dL/g; 0.60 to less than 0.70 dL/g; 0.60 to 0.68 dL/g; 0.60 to less than 0.68 dL/g; 0.60 to 0.65 dL/g; 0.60 to 0.64 dL/g; 0.60 to 0.68 dL/g; 0.64 to 0.83 dL/g; 0.64 to 0.80 dL/g; 0.64 to 0.75 dL/g; 0.64 to less than 0.75 dL/g; 0.64 to 0.72 dL/g; 0.64 to 0.70 dL/g; 0.64 to less than 0.70 dL/g; 0.67 to 0.83 dL/g; 0.67 to 0.80 dL/g; 0.67 to 0.75 dL/g; 0.67 to less than 0.75 dL/g; 0.67 to 0.72 dL/g; 0.69 dL/g to 0.83 dL/g; 0.69 dL/g to 0.82 dL/g; 0.69 dL/g to 0.80 dL/g; 0.69 dL/g to 0.75 dL/g; 0.69 dL/g to 0.72 dL/g; 0.72 dL/g to 0.83 dL/g; and 0.72 dL/g to 0.82 dL/g, all in Ih.V units.

The amorphous copolyester polymer of the invention desirably contains alkylene terephthalate repeat units in the polymer chain. More desirable are copolyester polymers which comprise the residues of:

(a) an acid component comprising at least 80 mole % of the residues of terephthalic acid, or desirably residues of the derivates of terephthalic acid; and (b) a hydroxyl component comprising at least 80 mole % of the residues of NPG and TACD, based on 100 mole percent of acid component residues and 100 mole percent of hydroxyl component residues in the copolyester polymer.

The amorphous copolyesters can be made by reacting NPG and TACD with a $C_1$-$C_4$ dialkyl ester of terephthalic acid to produce an ester monomer and/or oligomers, which are then polycondensed to produce the copolyester. More than one compound containing carboxylic acid group(s) or derivative(s) thereof can be reacted during the process. All the compounds that enter the process containing carboxylic acid group(s) or derivative(s) thereof that become part of said copolyester product comprise the "acid component." The "residues" of compound(s) containing carboxylic acid group(s) or derivative(s) thereof refers to the portion of said compound(s) which remains in the said copolyester product after all the compounds are condensed and polycondensed to form copolyester polymer chains of varying length.

More than one compound containing hydroxyl group(s) or derivatives thereof can become part of the copolyester polymer product(s). All the compounds that enter the process containing hydroxyl group(s) or derivatives thereof that become part of said copolyester product(s) comprise the hydroxyl component. The residues of hydroxyl functional compound(s) or derivatives thereof that become part of said copolyester product refers to the portion of said compound(s) which remains in said copolyester product after said compounds are is condensed with a compound(s) containing carboxylic acid group(s) or derivative(s) thereof and further polycondensed to form copolyester polymer chains of varying length.

The mole % of the hydroxyl residues and carboxylic acid residues in the product(s) can be determined by proton NMR or gas chromatography.

Desirably, the copolyester polymer comprises:
(a) an acid component comprising at least 80 mole %, or at least 85 mole %, or at least 90 mole %, or at least 92 mole %, or at least 96 mole % of terephthalic acid or desirably the residues of a $C_1$-$C_4$ dialkyl ester of terephthalic acid, or in any event at least 85 mole %, or at least 90 mole %, or at least 92 mole %, or at least 96 mole % terephthalate units which includes the —C(O)O— groups bonded to the aromatic ring; and
(b) a hydroxyl component comprising at least 85 mole %, or at least 90 mole %, or at least 92 mole %, or at least 96 mole % of the residues of TACD and NPG;

based on 100 mole percent of the acid component residues and 100 mole percent of the hydroxyl component residues in the copolyester polymer.

The reaction of the acid component with the hydroxyl component during the preparation of the copolyester polymer is not restricted to the stated mole percentages since one may add an excess of the hydroxyl component during the manufacturing. The copolyester polymer made by the reaction will, however, contain the stated amounts of acid component and hydroxyl component.

Derivates of terephthalic acid include $C_1$-$C_4$ dialkylterephthalates such as dimethylterephthalate. Desirably, the stated amount of the acid component is the residue of the $C_1$-$C_4$ dialkyl ester of terephthalic acid, or dimethylterephthalate.

In addition to terephthalic acid and $C_1$-$C_4$ dialkyl ester of terephthalic acids, TACD, and NPG, other acid components and hydroxyl components can be used as modifiers so long at the Tg of the polymer is maintained at a level of at least 90° C.

Examples of acid modifiers include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. More specific examples of modifier dicarboxylic acids useful as an acid component(s) are phthalic acid, isophthalic acid, naphthalene-2,6-dicarboxylic acid, cyclohexane-1,4-dicarboxylic acid, cyclohexanediacetic acid, diphenyl-4,4'-dicarboxylic acid, succinic acid, glutaric acid, suberic acid, adipic acid, azelaic acid, sebacic acid, dimer acid, sulfoisophthalic acid, fumaric acid, maleic acid, itaconic acid, 1,3-cyclohexanedicarboxylic acid, diglycolic acid, 2,5-norbornanedicarboxyclic acid, diphenic acid, 4,4'-oxydibenzoic acid, 4,4'-sulfonyldibenzoic acid, mixtures thereof, and the like. It should be understood that use of the corresponding acid anhydrides, esters, and acid chlorides of these acids is included in the term "carboxylic acid". It is also possible for tricarboxyl compounds and compounds with a higher number of carboxylic acid groups to modify the copolyester.

In addition to a hydroxyl component comprising NPG and TACD, the hydroxyl component of the present copolyester may include modifiers. Hydroxyl modifiers are any hydroxyl bearing compound other than NPG and TACD. Hydroxyl modifiers including mono-ols, diols, or compounds with a higher number of hydroxyl groups as branching monomers. Examples of modifier hydroxyl compounds include cycloaliphatic diols preferably having 6 to 20 carbon atoms and/or aliphatic diols preferably having 2 to 20 carbon atoms. More specific examples of such diols include ethylene glycol, diethylene glycol; triethylene glycol; 1,2-cyclohexanedimethanol; 1,3-cyclohexanedimethanol; 1,4-cyclohexanedimethanol; 1,2-propanediol; 1,3-propanediol; 1,4-butanediol; 1,5-pentanediol; 1,6-hexanediol; 3-methyl-2,4-pentanediol; 2-methyl-1,4-pentanediol; 2,2,4-trimethylpentane-1,3-diol; 2,5-ethylhexane-1,3-diol; 2,2-diethyl-1,3-propanediol; 1,3-hexanediol; 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; 2,2-bis-(4-hydroxypropoxyphenyl)-propane; 2-butyl-2-ethyl-1,3-propanediol, 2-ethyl-2-isobutyl-1,3-propanediol, 2,2,4,4-tetramethyl-1,6-hexanediol, 1,10-decanediol, 1,4-benzenedimethanol, hydrogenated bisphenol A, isosorbide, propylene glycol, dipropylene glycol, polytetramethylene glycol, tetraethylene glycol, polyethylene glycol, and higher functional hydroxyl compounds which can be used as branching compounds including 1,1,1-trimethylol propane, 1,1,1-trimethylolethane, glycerin, pentaerythritol, erythritol, threitol, dipentaerythritol, sorbitol, mixtures thereof, and the like.

One example of modifiers include isophthalic acid or naphthalene dicarboxylic acid added as acid modifiers, and cyclohexanedimethanol, ethylene glycol, or diethylene glycol added as hydroxyl modifiers.

The hydroxyl bearing modifiers, other than NPG and TACD, can be added in amount of less than 40 mole %, or less than 20 mole %, or less than 10 mole %, or less than 8 mole %, or less than 5 mole %, or less than 3 mole %, or less than 2 mole %, or less than 1 mole %, or less than 1 mole %, or less than 0.5 mole %, or less than 0.25 mole %, and desirably not added at all, based on the 100 mole percent of their respective component, acid or hydroxyl, in the polymer. The hydroxyl bearing modifiers, other than NPG and TACD, are also desirably present in the polymer in amounts of less than 20 mole %, or less than 10 mole %, or less than 5 mole %, or less than 4 mole %, or less than 2 mole %, or less than 1 mole %, or less than 0.5 mole %, based on the moles of all residues in the copolyester (which by definition includes the residues of the hydroxyl and acid component).

Desirably, the amount of all moieties present in the copolyester other than terephthalate, NGP, and TACD moieties, including both those due to modifiers added and those formed in situ during the melt phase polymerization, is less than 12 mole %, or not more than 10 mole %, or not more than 8 mole %, or not more than 6 mole %, or not more than or less than 5 mole %, or not more than 5 mole percent, or not more than 4 mole %, or not more than 2 mole %, or not more than 1 mole %, or not more than less than 0.5 mole %, or not more than or less than 0.25 mole %, or not more than or less than 0.1 mole %, or 0 mole %, based on the moles of all residues in the copolyester.

Desirably, the copolyester of the invention includes less than 5 mole % ethylene glycol residues, or less than 4 mole %, or less than 3 mole %, or less than 2 mole %, or less than 1 mole % based on the moles of all residues in the copolyester. Desirably, no ethylene glycol is added unless it is added as a carrier for a catalyst metal compound. Alternatively, no ethylene glycol is added.

The polyesters of the invention can comprise at least one chain extender. Suitable chain extenders include, but are not limited to, multifunctional (including, but not limited to, bifunctional) isocyanates, multifunctional epoxides, including for example, epoxylated novolacs, and phenoxy resins. In certain embodiments, chain extenders may be added at the end of the polymerization process or after the polymerization process. If added after the polymerization process, chain extenders can be incorporated by compounding or by addition during conversion processes such as injection molding or extrusion. The amount of chain extender used can vary depending on the specific monomer composition used and the physical properties desired but is generally about 0.1 percent by weight to about 10 percent by weight, such as about 0.1 to about 5 percent by weight, based on the total weight of the polyester.

The invention further relates to a polymer blend. The blend comprises:
(a) 5 to 95 weight % of at least one of the polyesters described above; and
(b) 5 to 95 weight % of at least one of the polymeric components.

In one embodiment, examples of the polymeric components include, but are not limited to, nylon, other polyesters different from those described herein, nylon, polyamides such as ZYTEL® from DuPont; polyesters different from those described herein; polystyrene, polystyrene copolymers, styrene acrylonitrile copolymers, acrylonitrile butadiene styrene copolymers, poly(methylmethacrylate), acrylic copolymers, poly(ether-imides) such as ULTEM® (a poly(ether-imide) from General Electric); polyphenylene oxides such as poly(2,6-dimethylphenylene oxide) or poly(phenylene oxide)/polystyrene blends such as NORYL 1000® (a blend of poly(2,6-dimethylphenylene oxide) and polystyrene resins from General Electric); other polyesters; polyphenylene sulfides; polyphenylene sulfide/sulfones; poly(ester-carbonates); polycarbonates such as LEXAN® (a polycarbonate from General Electric); polysulfones; polysulfone ethers; and poly(ether-ketones) of aromatic dihydroxy compounds or mixtures of any of the other foregoing polymers.

The copolyester composition may include blends of the amorphous copolyesters along with other thermoplastic polymers such as polycarbonate (PC) and polyamides. The blends can be prepared by conventional processing techniques known in the art, such as melt blending or solution blending. In one embodiment, it is preferred that the copolyester composition should comprise a majority of the amorphous copolyester polymers, more preferably in an amount of at least 80 wt %, or at least 95 wt %, and most preferably 100 wt. %, based on the weight of all thermoplastic polymers (excluding fillers, inorganic compounds or particles, fibers, impact modifiers, or other polymers which may form a discontinuous phase). In one embodiment, it is preferred that the copolyester polymers do not contain any fillers, fibers, or impact modifiers or other polymers which form a discontinuous phase.

Desirably, the copolyester composition contains less than 60 wt %, or less than 40 wt %, or less than 20 wt %, or less than 10 wt. %, or less than 5 wt. %, or no post-consumer recycled copolyester polymer ("PCR") present in the composition, based on the total weight of all copolyester polymers. In another embodiment, the composition contains PCR in an amount of greater than zero and less than 60 wt. %, or less than 40 wt. %, or less than 20 wt %, or less than 10 wt. %, based on the total weight of all copolyester polymers.

The copolyester composition comprises residues of TACD, and the process of the invention includes reacting TACD with the acid component to make a copolyester. It is desirable to use TACD. The TACD composition increases the Tg of the polymer.

The composition comprising TACD contains at least a 2,2,4,4-tetraalkylcyclobutane-1,3-diol compound. Such a compound can be represented by the general structure:

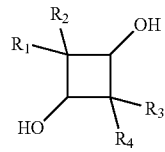

wherein $R_1$, $R_2$, $R_3$, and $R_4$ each independently represent an alkyl radical, for example, a lower alkyl radical having 1 to 8 carbon atoms. The alkyl radicals may be linear, branched, or a combination of linear and branched alkyl radicals. Desirably, at least one of $R_1$, $R_2$, $R_3$, and $R_4$ is a methyl group, and preferably each of $R_1$, $R_2$, $R_3$, and $R_4$ is a methyl group.

The method for the manufacture of 2,2,4,4-tetraalkylcyclobutane-1,3-diol is not limited and any conventional or method known at any time can be used. One known method is the hydrogenation reaction of 2,2,4,4-tetraalkylcyclobutane-1,3-dione to produce a 2,2,4,4-tetraalkylcyclobutane-1,3-diol as shown below:

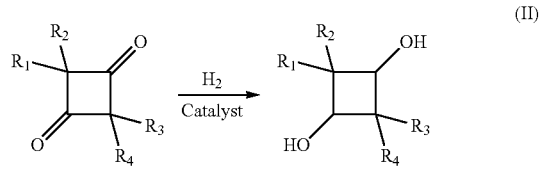

(II)

The 2,2,4,4-tetraalkylcyclobutane-1,3-dione, for example, 2,2,4,4-tetramethylcyclobutane-1,3-dione, is hydrogenated to the corresponding 2,2,4,4-tetraalkylcyclobutane-1,3-diol, for example, 2,2,4,4-tetramethylcyclobutane-1,3-diol.

The alkyl radicals $R_1$, $R_2$, $R_3$, and $R_4$ on the 2,2,4,4-tetraalkylcyclobutane-1,3-dione may each independently have 1 to 8 carbon atoms. 2,2,4,4-tetraalkylcyclobutane-1,3-diones that are suitably reduced to the corresponding diols include, but are not limited to, 2,2,4,4,-tetramethylcyclobutane-1,3-dione, 2,2,4,4-tetraethylcyclobutane-1,3-dione, 2,2,4,4-tetra-n-propylcyclobutane-1,3-dione, 2,2,4,4-tetra-n-butylcyclobutane-1,3-dione, 2,2,4,4-tetra-n-pentylcyclobutane-1,3-dione, 2,2,4,4-tetra-n-hexylcyclobutane-1,3-dione, 2,2,4,4-tetra-n-heptylcyclobutane-1,3-dione, 2,2,4,4-tetra-n-octylcyclobutane-1,3-dione, 2,2-dimethyl-4,4-diethylcyclobutane-1,3-dione, 2-ethyl-2,4,4-trimethylcyclobutane-1,3-dione, 2,4-dimethyl-2,4-diethylcyclobutane-1,3-dione, 2,4-dimethyl-2,4-di-n-propylcyclobutane-1,3-dione, 2,4-n-dibutyl-2,4-diethylcyclobutane-1,3-dione, 2,4-dimethyl-2,4-diisobutylcyclobutane-1,3-dione, and 2,4-diethyl-2,4-diisoamylcyclobutane-1,3-dione.

The corresponding 2,2,4,4-tetraalkylcyclobutane-1,3-diols that may be used as the TACD compound include 2,2,4,4-tetramethylcyclobutane-1,3-diol ("TMCD"), 2,2,4,4-tetraethylcyclobutane-1,3-diol, 2,2,4,4-tetra-n-propylcyclobutane-1,3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-dimethyl-4,4-diethylcyclobutane-1,3-diol, 2-ethyl-2,4,4-trimethylcyclobutane-1,3-diol, 2,4-dimethyl-2,4-diethyl-cyclobutane-1,3-diol, 2,4-dimethyl-2,4-di-n-propylcyclobutane-1,3-diol, 2,4-n-dibutyl-2,4-diethylcyclobutane-1,3-diol, 2,4-dimethyl-2,4-diisobutylcyclobutane-1,3-diol, and 2,4-diethyl-2,4-diisoamylcyclobutane-1,3-diol. Desirably the TACD compound comprises 2,2,4,4-tetramethylcyclobutane-1,3-diol.

The alkyl radicals $R_1$, $R_2$, $R_3$, and $R_4$ on the 2,2,4,4-tetraalkylcyclobutane-1,3-diol may each independently have 1 to 6 carbon atoms, or 1 to 5 carbon atoms, or 1 to 4 carbon atoms, or 1 to 3 carbon atoms, or 1 to 2 carbon atoms. Or, the alkyl radicals $R_1$, $R_2$, $R_3$, and $R_4$ on the 2,2,4,4-tetraalkylcyclobutane-1,3-diol may each have 1 carbon atom.

The hydrogenation of 2,2,4,4-tetraalkylcyclobutane-1,3-dione typically produces cis-2,2,4,4-tetraalkylcyclobutane-1,3-diol and trans-2,2,4,4-tetraalkylcyclobutane-1,3-diol. The cis/trans molar ratio of any of the species of TACD may range from 1.7 to 0.0 or 1.6 to 0.0 or 1.5 to 0.0 or 1.4 to 0.0 or 1.3 to 0.0 or 1.2 to 0.0 or 1.1 to 0.0 or 1.0 to 0.0 or 0.9 to 0.0 or 0.8 to 0.0 or 0.7 to 0.0 or 0.6 to 0.0 or 0.5 to 0.0 or 0.4 to 0.0 or 0.3 to 0.0 or 0.2 to 0.0 or 0.1 to 0.0. The cis/trans molar ratio may range from 1.7 to 0.1 or 1.6 to 0.1 or 1.5 to 0.1 or 1.4 to 0.1 or 1.3 to 0.1 or 1.2 to 0.1 or 1.1 to 0.1 or 1.0 to 0.1 or 0.9 to 0.1 or 0.8 to 0.1 or 0.7 to 0.1 or 0.6 to 0.1 or 0.5 to 0.1 or 0.4 to 0.1 or 0.3 to 0.1 or 0.2 to 0.1. Or cis/trans molar ratio may range from 1.7 to 0.2 or 1.6 to 0.2 or 1.5 to 0.2 or 1.4 to 0.2 or 1.3 to 0.2 or 1.2 to 0.2 or 1.1 to 0.2 or 1.0 to 0.2 or 0.9 to 0.2 or 0.8 to 0.2 or 0.7 to 0.2 or 0.6 to 0.2 or 0.5 to 0.2 or 0.4 to 0.2 or 0.3 to 0.2.

The moles of TACD residues added to the melt phase process, based on 100 mole % of the hydroxyl component, may be at least 20 mole %, or at least 30 mole %, or at least 40 mole %, or at least 50 mole %, or at least 60 mole %, or at least 70 mole %, or at least 80 mole %, and less than 90 mole %, or less than 85 mole %, or less than 80 mole %, or less than 75 mole %, or less than 70 mole %, or less than 65 mole %, based on all moles of the hydroxyl component added. Suitable ranges include 20-90, or 20-85, or 20-80, or 20-75, or 20-70, or 20-65, or 30-90, or 30-85, or 30-80, or 30-75, or 30-70, or 30-65, or 30-60, or 40-90, or 40-85, or 40-80, or 40-75, or 40-70, or 40-65, or 40-60, or 50-90, or 50-85, or 50-80, or 50-75, or 50-70, or 50-65, or 50-60, or 60-90, or 60-85, or 60-80, or 60-75, or 60-70, or 60-65, or 70-90, or 70-85, or 70-80, or 70-75, or 80-90, or 80-85, in each case as a mole based on the moles of the hydroxyl component.

The mole % of residues of TACD present in the copolyester, based on the moles of all residues in the copolyester, may be at least 10 mole %, or at least 15 mole %, or at least 20 mole %, or at least 25 mole %, or at least 30 mole %, or at least 35 mole %, or at least 40 mole %, and less than 45 mole %, or less than 40 mole %, or less than 35 mole %, or less than 30 mole %. Suitable ranges include 10-45, or 15-45, or 20-45, or 25-45, or 30-45, or 35-45, or 40-45, or 10-40, or 15-40, or 20-40, or 25-40, or 30-40, or 35-40, or 10-35, or 15-35, or 20-35, or 25-35, or 30-35, or 10-30, or 15-30, or 20-30, or 25-30, or 10-25, or 15-25, or 20-25, or 15-20, in each case based on the moles of all residues in the copolyester.

The copolyester also contains residues of neopentyl glycol, or 2,2-dimethyl-1,3-propanediol ("NPG"). The amount of NPG added to the melt phase process, based on the amount of 100 mole % of the hydroxyl component, is at least 10 mole %, or at least 15 mole %, or at least 20 mole %, or at least 30 mole %, or at least 40 mole %, or at least 50 mole %, or at least 60 mole %, or at least 70 mole %, and less than 80 mole %, or less than 75 mole %, or less than 70 mole %, or less than 65 mole %, or less than 60 mole %, or less than 55 mole %, or less than 50 mole %, or less than 45 mole %. Suitable ranges include 10-80, or 10-75, or 10-70, or 10-65, or 10-60, or 10-60, or 10-55, or 10-50, or 10-45, or 20-80, or 20-75, or 20-70, or 20-65, or 20-60, or 20-65, or 20-60, or 20-55, or 20-50, or 20-45, or 30-80, or 30-75, or 30-70, or 30-65, or 30-60, or 30-55, or 30-50, or 30-45, or 40-80, or 40-75, or 40-70, or 40-65, or 40-60, 40-55, or 40-50, or 40-45, or 50-80, or 50-75, or 50-70, or 50-65, or 50-60, or 60-80, or 60-75, or 60-70, or 60-65, or 70-80, or 70-75, or 80-90, or 80-85, in each case as a mole % based on the moles of the hydroxyl component.

The mole % of residues of NPG present in the copolyester, based on the moles of all residues in the copolyester, may be at least 5 mole %, or at least 7 mole %, or at least 8 mole %, or at least 10 mole %, or at least 15 mole %, or at least 20 mole %, or at least 25 mole %, or at least 30 mole %, or at least 35 mole %, or at least 40 mole %, and less than less than 40 mole %, or less than 35 mole %, or less than 30 mole %. Suitable ranges include 5 to 40, or 7 to 40, or 8 to 40, or 10-40, or 15-40, or 20-40, or 25-40, or 30-40, or 35-40, 5 to 35, or 7 to 35, or 8 to 35, or or 10-35, or 15-35, or 20-35, or 25-35, or 30-35, or 5 to 30, or 7 to 30, or 8 to 30, or 10-30, or 15-30, or 20-30, or 25-30, or 5 to 25, or 7 to 25, or 8 to 25, or 10-25, or 15-25, or 20-25, or 5 to 20, or 7 to 20, or 8 to 20, or 15-20, in each case as a mole % based on the moles of the copolyester polymer.

The copolyester composition also contains aluminum atoms. Desirably, the aluminum atoms are present as residues of an aluminum catalyst added to the melt phase process for making the copolyester polymer, and the oxidation state, morphological state, structural state, or chemical state of the aluminum compound as added or of the residue present in the composition is not limited. The aluminum residue may be in a form identical to the aluminum compound as added to the melt phase reaction, but may be altered since the aluminum participates in accelerating the rate of polycondensation. By the term "aluminum atoms" or "aluminum" is meant the presence of aluminum in the copolyester polymer detected through any suitable analytical technique regardless of the oxidation state of the aluminum. Suitable detection methods for the presence of aluminum include inductively coupled plasma optical emission spectroscopy (ICP-OES). The concentration of aluminum is reported as the parts per million of metal atoms based on the weight of the polymer. The term "metal" does not imply a particular oxidation state.

Aluminum may be added to the melt phase process (the method of addition not being limited and including adding the aluminum compound to the catalyst mix tank of the melt phase process, feeding to directly a melt phase vessel, or feeding into pipes connecting vessels) as a compound (which includes a salt or a complex), or as a metal provided that it is ultimately active as a catalyst in the polycondensation phase either alone or in combination with the alkali metal or alkaline earth metal atoms or compounds. It is desirable to select an aluminum compound which can be dissolved in a diluent or a carrier that is volatile and/or reactive with the copolyester forming ingredients. Suitable liquid reactive carriers can have any molecular weight, such as those ranging from 62 to about 10,000 grams per mole. Aluminum compounds can also be added as slurries or suspensions in a liquid that is volatile and/or reactive with the copolyester forming ingredients. Aluminum can also be added to the melt phase process by melt blending the aluminum compound with a copolyester polymer in a suitable extruder or other device to form a concentrate, and subsequently, preferably melting the concentrate as a molten feed to the melt phase process. A preferred mode of addition of aluminum compounds is addition to a catalyst mix tank, which is part of the copolyester melt phase process equipment. Preferably, the catalyst mix tank also contains an alkali metal compound or an alkaline earth compound or alkali compound as well as a suitable solvent. A suitable solvent can include any of the hydroxyl compounds used as reactants to make the copolyester. A desirable solvent is ethylene glycol. Alternatively, a solvent consisting of a 50/50 w/w/mixture of ethylene glycol and neopentyl glycol is also desirable.

For example, an aluminum compound and an alkali metal compound or an alkaline earth metal compound or an alkali compound can be heated at a temperature and for an amount of time to affect dissolution initially. Suitable temperatures include 110 to 140° C., or 115 to 135° C., for one to four hours. A nitrogen purge can minimize color formation in the solution or mixture if color bodies are a problem. The nitrogen purge rate should be sufficient to remove volatiles that react to form color bodies, such as from 0.5 to 3 scfm, or 1 to 2 scfm. To maintain or improve solubility, it is helpful to keep the solution or mixture at 115 to 135° C. with a nitrogen purge. The contents of the catalyst mix tank may be transferred to a catalyst feed tank, which may be utilized to introduce the solution or mixture into the copolyester melt phase manufacturing process. The catalyst mix can be filtered to remove any insoluble material prior to feeding to the polymerization process.

Aluminum compounds of the invention are catalytically active.

Examples of aluminum compounds include aluminum compounds with at least one organic substituent. Illustrative examples of suitable compounds include those of the formula:

wherein R, R', R" are independently an alkyl group, aryl group, acyl group or hydrogen, where preferably at least one of R, R' R" and R'" is not hydrogen, R'" is an anionic group, and a, b, c, d are independently 0 or positive integers, and a+b+c+d is equal to 3 or no greater than 3.

Suitable examples of aluminum compounds include the carboxylic acid salts of aluminum such as aluminum acetate (if solubilized), aluminum benzoate, aluminum lactate, aluminum laurate, aluminum stearate, aluminum alcoholates such as aluminum ethylate, aluminum isopropylate (also known as aluminum isopropoxide), aluminum tri n-butyrate, aluminum tri-tert-butyrate, mono-sec-butoxyaluminum diisopropylate, and aluminum chelates in which the alkoxy group of an aluminum alcoholate is partially or wholly substituted by a chelating agents such as an alkyl acetoacetate or acetylacetone such as ethyl acetoacetate aluminum diisopropylate, aluminum tris(ethyl acetoacetate), alkyl acetoacetate aluminum diisopropylate, aluminum monoacetylacetate bis (ethyl acetoacetate), aluminum tris(acetyl acetate), aluminum acetylacetonate.

Desirable among the aluminum compounds is aluminum isopropoxide.

The amount of aluminum atoms present in the copolyester polymer generally ranges from at least 5 ppm, or at least 8 ppm, or at least 10 ppm, or at least 15 ppm, or at least 20 ppm, or at least 25 ppm, or at least 30 ppm, or at least 35 ppm, or at least 40 ppm, or at least 45 ppm, or at least 50 ppm, and less than 100 ppm, or less than 90 ppm, or less than 80 ppm, or less than 75 ppm, or less than 70 ppm, or less than 65 ppm, or less than 60 ppm, or less than 55 ppm Al based on the weight of the polymer.

Desirably, the range of aluminum atoms by weight is from 10 ppm to 100 ppm, or 20 ppm to 100 ppm, or 25 ppm to 100 ppm, or 30 ppm to 100 ppm, or 35 ppm to 100 ppm, or 40 ppm to 100 ppm, or 45 ppm to 100 ppm, or 50 ppm to 100 ppm, or 10 ppm to 75 ppm, or 15 ppm to 75 ppm, or 20 ppm to 75 ppm, or 25 ppm to 75 ppm, or 30 ppm to 75 ppm, or 35 ppm to 75 ppm, or 40 ppm to 75 ppm, or 45 ppm to 75 ppm, or 50 ppm to 75 ppm, or 10 ppm to 65 ppm, or 20 ppm to 65 ppm, or 30 ppm to 65 ppm, or 35 ppm to 65 ppm, or 40 ppm to 65 ppm, or 45 ppm to 65 ppm, 10 ppm to 50 ppm, or 20 ppm to 50 ppm, or 30 ppm to 50 ppm, or 35 ppm to 50 ppm, or 40 ppm to 50 ppm, 10 ppm to 40 ppm, or 20 ppm to 40 ppm, or 30 ppm to 40 ppm, or 10 ppm to 35 ppm, or 20 ppm to 35 ppm, or 30 ppm to 35 ppm, or 10 ppm to 30 ppm, or 20 ppm to 30 ppm based on the weight of the copolyester.

The copolyester composition contains an alkali metal residue or an alkaline earth metal residue, in any form or oxidation state. Their oxidation states or ultimate physical, morphological, structural, or chemical states are not limited. The word "alkali metal" or "alkaline earth metal" or "metal" includes the atom in its elemental state or in an oxidation state corresponding to its allowable valences in its Periodic group. The chemical state of the alkali upon addition is also not limited. The alkali may be added as a metal compound, organometallic compound, or as a compound without a metal. Likewise, the chemical state of the alkaline earth metal compound or alkali metal compound upon addition is not limited.

The alkali metals and alkaline earth metals include the metals in Group IA and Group IIA or the periodic table, including but not limited to Li, Na, K, Rb, Cs, Mg, Ca, Sr, and preferably Li, Na or K. The metals may be added to the melt phase as metal compounds (which includes a complex or a salt) having counterions, among which the preferred ones are hydroxides, carbonates, and carboxylic acids.

Desirably, the amount of Group 1A or IIA metal atoms is within a range of from 5 ppm to 75 ppm, or 10 ppm to 60 ppm, or 15 ppm to 50 ppm, or 20 ppm to 50 ppm, or 25 ppm to 50 ppm, or 5 ppm to 45 ppm, or 10 ppm to 45 ppm, or 15 ppm to 45 ppm, or 20 ppm to 45 ppm, or 25 ppm to 45 ppm, or 5 ppm to 40 ppm, or 10 ppm to 40 ppm, or 15 ppm to 40 ppm, or 20 ppm to 40 ppm, or 25 ppm to 40 ppm, or 5 ppm to 35 ppm, or 10 ppm to 35 ppm, or 15 ppm to 35 ppm, or 20 ppm to 35 ppm, or 25 ppm to 35 ppm, or 5 ppm to 30 ppm, or 10 ppm to 30 ppm, or 15 ppm to 30 ppm, or 20 ppm to 30 ppm. In each case, the metal is desirably an alkali metal such as Li.

The ratio of the moles of alkali metal or moles of alkaline earth metal to the moles of aluminum (M:Al) is not limited but desirably ranges from at least 0.1, or at least 0.25, or at least 0.5, or at least 0.75, or at least 1, or at least 2, and less than about 15, less than about 10, less than about 7, less than about 6, less than about 5. Desirably, the M:Al molar ratio is at least 1.5, or at least 2 and less than 7.

The copolyester also contains tin atoms. The tin atoms from the tin catalyst are useful to improve the insertion of TMCD into the polymer backbone. By improving the insertion of TMCD into the backbone, the process is economically advantageous by avoiding the use of large excesses of TMCD charges to the esterification zone that are required to obtain the desired target amount of TMCD into the copolyester, or by using the same charge, results in an increased level of TMCD inserted into the copolyester, thereby improving the Tg of the copolyester.

Tin atoms may be added to the melt phase process (the method of addition not being limited and including adding the tin compound to the catalyst mix tank of the melt phase process, feeding to directly a melt phase vessel, or feeding into pipes connecting vessels, feeding to the first esterification vessel, and feeding as the first catalyst to the melt phase process prior to addition of aluminum and alkali or alkaline earth metal catalysts) as a compound (which includes a salt or a complex), or as a metal provided that they are ultimately active as a catalyst in the polycondensation phase either alone or in combination with the aluminum, alkali metal and/or or alkaline earth metal atoms or compounds. At least a portion of the tin atoms of the invention are catalytically active as compounds or metals. It is desirable to select a tin catalyst compound which can be dissolved in a diluent or a carrier that is volatile and/or reactive with the copolyester forming ingredients, or that is a liquid at ambient temperatures and can be fed directly to the process as a liquid; or as a low-melting solid that can be heated to form a liquid with can be fed directly to the process. Suitable liquid reactive carriers can have any molecular weight, such as those ranging from 62 to about 10,000 grams per mole. Tin compounds can also be added as slurries or suspensions in a liquid that is volatile and/or reactive with the copolyester forming ingredients. Tin can also be added to the melt phase process by melt blending the tin compound with a copolyester polymer in a suitable extruder or other device to form a concentrate, and subsequently, preferably melting the concentrate as a molten feed to the melt phase process. A preferred mode of addition of tin compounds is addition to a catalyst mix tank, which is part of the copolyester melt phase process equipment. A suitable solvent can include any of the hydroxyl compounds used as reactants to make the copolyester.

For example, a tin compound, an aluminum compound and an alkali metal compound or an alkaline earth metal compound can be heated at a temperature and for an amount of time to affect dissolution initially. Suitable temperatures include 110 to 140° C., or 115 to 135° C., for one to four hours. A nitrogen purge can minimize color formation in the solution or mixture if color bodies are a problem. The nitrogen purge rate should be sufficient to remove volatiles that react to form color bodies, such as from 0.5 to 3 scfm, or 1 to 2 scfm. To maintain or improve solubility, it is helpful to keep the solution or mixture at 115 to 135° C. with a nitrogen purge. The contents of the catalyst mix tank may be transferred to a catalyst feed tank, which may be utilized to introduce the solution or mixture into the copolyester melt phase manufacturing process.

Desirably, the tin catalyst is added to the melt phase manufacturing process, and specifically during esterification before the addition of the aluminum atoms and the alkali or alkaline earth metal atoms. For example, the tin atoms that form part of the tin catalyst can be mixed with one or more of the acid component and/or hydroxyl component which are fed to the esterification process or the first esterification vessel. After reacting the acid component and hydroxyl component to form a reaction mixture after at least 1 minute of reaction time, or at least 5 minutes, or at least 15 minutes, or at least 20 minutes, the aluminum and alkali or alkaline earth metal catalyst can be added to the reaction mixture. This is particularly desirable when high catalyst loadings of tin are utilized. By adding tin catalysts first, one may achieve a copolyester that has a good IV and/or reduce the residence time of the melt in the finisher vessel or zone.

Suitable examples of tin compounds include the organotin salts, the organotin oxides, and stannoic acids For example, see U.S. Pat. No. 2,720,507, where the portion concerning tin catalysts is incorporated herein by reference. These catalysts are tin compounds containing at least one organic radical. These catalysts include compounds of both divalent or tetravalent tin which have the general formulas set forth below:

| | |
|---|---|
| $M_2(Sn(OR)_4)$ | A. |
| $MH(Sn(OR)_4)$ | B. |
| $M'(Sn(OR)_4)$ | C. |
| $M'(HSn(OR)_4)_2$ | D. |
| $M_2(Sn(OR)_6)$ | E. |
| $MH(Sn(OR)_6)$ | F. |
| $M'(Sn(OR)_6)$ | G. |
| $M'(HSn(OR)_6)_2$ | H. |
| $Sn(OR)_2$ | I. |
| $Sn(OR)_4$ | J. |
| $SnR'_2$ | K. |
| $SnR'_4$ | L. |
| $R'_2SnO$ | M. |
| 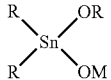 | N. |
| 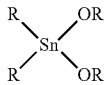 | O. |
| 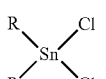 | P. |
| 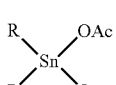 | Q. | wherein M is an alkali metal, e.g. lithium, sodium, or potassium, M' is an alkaline earth metal such as Mg, Ca or Sr, each R represents an alkyl radical containing from 1 to 8 carbon atoms, each R' radical represents a substituent selected from those consisting of alkyl radicals containing from 1 to 8 carbon atoms (i.e. Rradicals) and aryl radicals of the benzene series containing from 6 to 9 carbon atoms (e.g. phenyl, tolyl, benzyl, phenyl ethyl, etc., radicals), and Ac represents an acyl radical derived from an organic acid containing from 2 to 18 carbon atoms (e.g. acetyl, butyryl, lauroyl, benzoyl, stearoyl, etc.).

Bimetallic alkoxide catalysts can be made as described by Meerwein, Ann. 476, 113 (1929). As shown by Meerwein, these catalysts are not merely mixtures of the two metallic alkoxides. They are definite compounds having a salt-like structure. These are the compounds depicted above by the Formulas A through H. Those not specifically described by Meerwein can be prepared by procedures analogous to the working examples and methods set forth by Meerwein. The other tin compounds can also be made by various methods such as those described in the following literature:

For the preparation of diaryl tin dihalides (Formula P) see Ber. 62,996 (1929); J. Am. Chem. Soc. 49, 1369 (1927). For the preparation of dialkyl tin dihalides (Formula P) see J. Am. Chem. Soc. 47, 2568 (1925); c.A. 41, 90 (1947). For the preparation of diaryl tin oxides (Formula M) see J. Am Chem. Soc. 48, 1054 (1926). For the preparation of tetraaryl tin compounds (Formula K) see c.A. 32, 5387 (1938). For the preparation of tin alkoxides (Formula J) see c.A. 24, 586.1930).

For the preparation of alkyl tin salts (Formula Q) see c.A. 31, 4290. For the preparation of alkyl tin compounds see c.A. 35, 2470 (1941): c.A. 33, 5357 (1939). For the preparation of mixed alkyl aryl tin (Formulas K and L) see c.A. 31, 4290 (1937): c.A. 38, 331 (1944). For the preparation of other tin compounds not covered by these citations see "Die Chemie der Metal-Organischen Verbindungen." by Krause and V. Grosse, published in Berlin, 1937, by Gebroder-Borntrager.

The tin alkoxides (Formulas I and J) and the bimetallic alkoxides (Formulas A through H) contain R substituents which can represent both straight chain and branched chain alkyl radicals, e.g. diethoxide, tetramethoxide, tetrabutoxide, tetra-tert-butoxide, tetrahexoxide, etc.

The alkyl derivatives (Formulas K and L) contain one or more alkyl radicals attached to a tin atom through a direct C—Sn linkage, e.g. dibutyl tin, dihexyl tin, tetra-butyl tin, tetraethyl tin, tetramethyl tin, dioctyl tin, etc. Two of the tetraalkyl radicals can be replaced with an oxygen atom to form compounds having Formula M, e.g. dimethyl tin oxide, diethyl tin oxide, dibutyl tin oxide, diheptyl tin oxide, etc. In one embodiment, the tin catalyst comprises dimethyl tin oxide.

Complexes can be formed by reacting dialkyl tin oxides with alkali metal alkoxides in an alcohol solution to form compounds having Formula N, which compounds are especially useful catalysts, e.g. react dibutyl tin oxide with sodium ethoxide, etc. This formula is intended to represent the reaction products described. Tin compounds containing alkyl and alkoxy radicals are also useful catalysts (see Formula 0), e.g. diethyl tin diethoxide, dibutyl tin dibutoxide, dihexyl tin dimethoxide, etc.

Salts derived from dialkyl tin oxides reacted with carboxylic acids or hydrochloric acid are also of particular value as catalysts; see Formulas P and Q. Examples of these catalytic condensing agents include dibutyl tin diacetate, diethyl tin dibutyrate, dibutyl tin dilauroate, dimethyl tin dibenzoate, dibutyl tin dichloride, diethyl tin dichloride, dioctyl tindichloride, dihexyl tin distearate, etc.

The tin compounds having Formulas K, L and M can be prepared wherein one or more of the R' radicals represents an aryl radical of the benzene series, e.g. phenyl, tolyl, benzyl, etc. Examples include diphenyl tin, tetraphenyl tin, diphenyl dibutyl tin, ditolyl diethyl tin, diphenyl tin oxide, dibenzyl tin, tetrabenzyl tin, di([B-phenylethyl)-tin oxide, dibenzyl tin oxide, etc, The amount of tin atoms present in the copolyester polymer generally ranges from at least 3 ppm, or at least 5 ppm, or at least 8 ppm, or at least 10 ppm, or at least 15 ppm, or at least 20 ppm, or at least 30 ppm, and less than 100 ppm, or less than 100 ppm, or up to 75 ppm, or up to 65 ppm or up to 60 ppm or up to 50 ppm or up to 45 ppm tin based on the weight of the polymer.

Suitable exemplary ranges include from 3 ppm to 100 ppm, or 3 ppm to 75 ppm, or 3 ppm to 65 ppm, or 3 ppm to 60 ppm, or 3 ppm to 50 ppm, or 3 ppm to 45 ppm, or 5 ppm to 100 ppm, or 5 ppm to 75 ppm, or 5 ppm to 65 ppm, or 5 ppm to 60 ppm, or 5 ppm to 50 ppm, or 5 ppm to 45 ppm, or 10 ppm to 75 ppm, or 10 ppm to 65 ppm, or 10 ppm to 60 ppm, or 10 ppm to 50 ppm, or 10 ppm to 45 ppm, or 20 ppm to 75 ppm, or 20 ppm to 65 ppm, or 20 ppm to 60 ppm, or 20 ppm to 50 ppm, or 20 ppm to 45 ppm, or 30 ppm to 75 ppm, or 30 ppm to 65 ppm, or 30 ppm to 60 ppm, or 30 ppm to 50 ppm, or 30 ppm to 45 ppm.

The order of addition of catalyst metals is not limited. The aluminum, alkali or alkaline earth metal atoms, and tin atoms may be added together or as separate streams, together with acid component or the hydroxyl component prior to feeding one or both to the first esterification vessel, or fed together or separately into a first esterification vessel separate from the feed of the acid component or the hydroxyl component, or fed sequentially. For example, the tin atoms may be pre-mixed together with the acid component, which can be formed into a paste, and the paste fed into the first esterification vessel, followed by feeding the aluminum and alkali or alkaline earth metal atoms into the last esterification vessel, into a line or vessel between the esterification phase and the polycondensation phase, or at or into the polycondensation phase vessels or lines.

To avoid potential undesirably side reactions between aluminum catalyst and water generated in the esterification zone which may inhibit or deactivate the aluminum catalyst and thereby slow down the rate of polycondensation, it is desirable in yet another embodiment to add the aluminum compounds after substantial completion of the esterification reaction or at the beginning of or during polycondensation. In a further embodiment, at least 75%, or at least 85%, or at least 95% of the esterification reaction (in terms of conversion) is conducted in the absence of added aluminum compounds. It is desirable to add the aluminum compound and the alkali metal or alkaline earth metal compound at or near the same addition point. It is most desirable to premix and heat the aluminum compound and the alkali metal or alkaline earth metal compound, like in a catalyst mix tank, prior to addition to the melt phase manufacturing line for copolyester polymers.

Other catalyst metals may be present if desired. For example, Mn, Zn, Sb, Co, Ti, and Ge catalysts may be used in conjunction with aluminum and alkaline earth metals or alkali catalysts. Titanium and zinc catalysts can be used, particularly if melt phase manufacture involves ester exchange reactions. The amount of titanium catalyst, if used, generally ranges from 2 ppm to 30 ppm, based on the weight of the polymer. Zinc catalysts can also be used in combination with the Sn/Al/alkali or alkaline earth metal system of the invention in amounts that are the same as the amounts from 30 to 80 ppm. It may be necessary to add a stabilizer such as a phosphorus compound if catalytic metals other than aluminum, alkaline earth metals, or alkali metals are present.

Desirably, the copolyester polymer is made without the addition of titanium catalyst, cobalt catalyst, zinc catalyst or antimony catalyst to the melt phase reaction. More preferably, the copolyester polymer is made without the addition of any catalytically active metal or metal compounds to the melt phase reaction other than the tin/aluminum/alkali metal or alkaline earth or alkali system It is to be recognized, however, that one or more of metals such as cobalt or manganese will most likely be present at low levels in the melt because they come as impurities with the terephthalic acid composition made from a metal-catalyzed, liquid-phase oxidation process. Metal impurities present in the raw material supply to the melt phase process are not considered to be metals added to the melt phase process.

The weight of aluminum and alkaline earth metal or alkali metal and tin and other co-catalyst metals can be measured upon addition to the melt phase or by analytical techniques for detecting the amount in the finished polymer or article. Suitable detection methods for the presence of aluminum and alkali metals or alkaline earth metals include inductively coupled plasma optical emission spectroscopy (ICP-OES). While X-ray fluorescence spectroscopy (XRF) is a suitable detection method for some alkaline earth metals and some alkali metals, it is not suitable for detecting aluminum at lower levels, like those found in copolyester. The concentration of an alkaline earth metal or an alkali metal is reported as the parts per million of metal atoms based on the weight of the polymer.

The aluminum and alkali or alkaline earth metals may be added as a solution, fine dispersion, a paste, a slurry, or neat. They are preferably added as a liquid, a melt, or a free flowing solid which can be metered. Most preferably they are added as a liquid, and in particular as a liquid solution or dispersion.

Optionally, the copolyester polymer also contains a stabilizer. By a catalyst stabilizer is meant a compound effective to at least partially deactivate or inhibit the activity of the catalyst system. Stabilizers useful in the invention can be phosphorus-based acids wherein one or more of the hydrogen atoms of the acid compound (bonded to either oxygen or phosphorus atoms) are replaced with alkyl, branched alkyl, substituted alkyl, alkyl ethers, substituted alkyl ethers, alkylaryl, alkyl-substituted aryl, aryl, substituted aryl, and mixtures thereof. The esters can contain alkyl, branched alkyl, substituted alkyl, alkyl ethers, aryl, and/or substituted aryl groups. The esters can also have at least one alkyl group and at least one aryl group. The number of ester groups present in the particular phosphorus compound can vary from zero up to the maximum allowable based on the number of hydroxyl groups present on the phosphorus compound used. For example, an alkyl phosphate ester can include one or more of the mono-, di-, and tri alkyl phosphate esters; an aryl phosphate ester includes one or more of the mono-, di-, and tri aryl phosphate esters; and an alkyl phosphate ester and/or an aryl phosphate ester also include, but are not limited to, mixed alkyl aryl phosphate esters having at least one alkyl and one aryl group.

The stabilizers useful in the invention include alkyl, aryl or mixed alkyl aryl esters or partial esters of phosphoric acid, phosphorus acid, phosphinic acid, phosphonic acid, or phosphonous acid. The alkyl or aryl groups can contain one or more substituents.

For example, the phosphorus compounds can be at least one of substituted or unsubstituted alkyl phosphate esters, substituted or unsubstituted aryl phosphate esters, substituted or unsubstituted mixed alkyl aryl phosphate esters, diphosphites, salts of phosphoric acid, phosphine oxides, and mixed aryl alkyl phosphites, reaction products thereof, and mixtures thereof. The phosphate esters include esters in which the phosphoric acid is fully esterified or only partially esterified.

The phosphate esters include esters in which the phosphoric acid is fully esterified or only partially esterified. In one embodiment, for example, the thermal stabilizers useful in the invention can include at least one phosphate ester.

The phosphate esters can include alkyl, alkoxy-alkyl, phenyl, or substituted phenyl groups. These phosphate esters are generally referred to herein as alkyl and/or aryl phosphate esters. Certain preferred embodiments include trialkyl phosphates, triaryl phosphates, alkyl diaryl phosphates, dialkyl aryl phosphates, and mixtures of such phosphates, wherein the alkyl groups are preferably those containing from 2 to 12 carbon atoms, and the aryl groups are preferably phenyl.

Representative alkyl and branched alkyl groups are those containing from 1-12 carbon atoms, including but not limited to, ethyl, propyl, isopropyl, butyl, hexyl, cyclohexyl, 2-ethylhexyl, octyl, decyl and dodecyl. Substituted alkyl groups include, but are not limited to, those containing at least one of carboxylic acid groups and esters thereof, hydroxyl groups, amino groups, keto groups, and the like.

Representative of alkyl-aryl and substituted alkyl-aryl groups are those wherein the alkyl portion contains from 1-12 carbon atoms, and the aryl group is phenyl or substituted phenyl wherein groups such as alkyl, branched alkyl, aryl, hydroxyl, and the like are substituted for hydrogen at any carbon position on the phenyl ring. Aryl groups include phenyl or substituted phenyl wherein groups such as alkyl, branched alkyl, aryl, hydroxyl and the like are substituted for hydrogen at any position on the phenyl ring.

Other useful phosphate esters include dibutylphenyl phosphate, triphenyl phosphate, tricresyl phosphate, tributyl phosphate, tri-2-ethylhexyl phosphate, trioctylphosphate, and/or mixtures thereof, including particularly mixtures of tributyl phosphate and tricresyl phosphate, and mixtures of isocetyl diphenyl phosphate and 2-ethylhexyl diphenyl phosphate.

Examples of aryl phosphates include Merpol A. Merpol A is a phosphate ester commercially available from Stepan Chemical Co and/or E.I. duPont de Nemours & Co. The CAS Registry number for Merpol A is believed to be 30 CAS Registry #37208-27-8.

Amounts of stabilizer added during polymerization or post manufacturing, if added, can include but are not limited to: 1 to 200 ppm, 1 to 150 ppm, 1 to 100 ppm; 1 to 50 ppm, 1 to 30 ppm, 1 to 20 ppm, 1 to 15 ppm, 1 to 10 ppm, 1 to 8 ppm, 1 to 5 ppm, or 1 to 3 ppm, based on the total weight of the polyester composition.

The copolyesters can be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors. The term "continuous" as used herein means a process wherein reactants are introduced and products withdrawn simultaneously in an uninterrupted manner. By "continuous" it is meant that the process is substantially or completely continuous in operation in contrast to a "batch" process. "Continuous" is not meant in any way to prohibit normal interruptions in the continuity of the process due to, for example, start-up, reactor maintenance, or scheduled shut down periods. The term "batch" process as used herein means a process wherein all the reactants are added to the reactor and then processed according to a predetermined course of reaction during which no material is fed or removed into the reactor. The term "semicontinuous" means a process where some of the reactants are charged at the beginning of the process and the remaining reactants are fed continuously as the reaction progresses. Alternatively, a semicontinuous process may also include a process similar to a batch process in which all the reactants are added at the beginning of the process except that one or more of the products are removed continuously as the reaction progresses.

The copolyester compositions useful in the invention can be made by processes known from the literature such as, for example, by processes in homogenous solution, by transesterification processes in the melt, and by two phase interfacial processes. Suitable methods include, but are not limited to, the steps of reacting an acid component with the hydroxyl component at a temperature within a range of 100° C. to 315° C. and at a pressure within a range of 0.1 to 760 mm Hg. See U.S. Pat. No. 3,772 and U.S. Pat. No. 2,720,507 for methods of producing polyesters, the disclosures of each which are hereby incorporated herein by reference.

For example, the process comprises the steps of:
(A) heating the acid component and the hydroxyl component in the presence of at least one catalyst selected from a tin catalyst, an aluminum catalyst, and a alkali or alkaline earth metal catalyst, and optionally with a stabilizer to a temperature of 150 to 250° C. wherein:
(i) the acid component comprises at least 80 mole % of the residues of terephthalic acid, or desirably residues of the derivates of terephthalic acid; and (ii) the hydroxyl component comprises at least 80 mole % of the residues of NPG and TACD, based on 100 mole percent of acid component residues and 100 mole percent of hydroxyl component residues in the copolyester polymer; and (B) polycondensing the product of Step (A) by heating it at a temperature of 275 to 320° C. for 1 to 6 hours.

Reaction times for the esterification Step (A) are dependent upon the selected temperatures, pressures, and feed mole ratios of the hydroxyl component to the acid component. Step (A) can be carried out until 50% by weight or more of the TACD has been reacted. Step (A) may be carried out under pressure, ranging from 0 psig to 100 psig.

In step (B), the reaction mixture can be placed under a pressure ranging, from 0.002 psig to below atmospheric pressure, or by blowing hot nitrogen gas over the mixture.

As an example, one can make the copolyester by a process comprising;

(A) esterifying or trans-esterifying by heating a mixture to a temperature ranging from 150° C. to 200° C. under a pressure ranging from 0 psig to 75 psig wherein said mixture comprises:

(i) an acid component comprising at least 80 mole % of the residues of terephthalic acid, or desirably residues of the derivates of terephthalic acid; and (ii) a hydroxyl component comprising at least 80 mole % of the residues of NPG and TACD, based on 100 mole percent of acid component residues and 100 mole percent of hydroxyl component residues in the copolyester polymer.

wherein the molar ratio of hydroxyl component to the acid component added in Step (A) is within a range of 1.0-1.5/1.0; wherein the mixture in Step (A) is heated in the presence of at least one catalyst comprising alkali or alkaline earth metal atoms, aluminum atoms, and tin atoms; and (B) polycondensing the product of Step (A) at a temperature of 275° C. to 320° C. for 1 to 6 hours, under a pressure within a range of the final pressure of Step (A) down to 0.02 torr absolute.

The stabilizer, reaction products thereof, and mixtures thereof can be added either during esterification, polycondensation, or both and/or it can be added post-polymerization. For example, the stabilizer can be added during esterification, or both during esterification and polycondensation, or only during polycondensation.

Reaction times for the esterification Step (A) are dependent upon the selected temperatures, pressures, and feed mole ratios of glycol to dicarboxylic acid. The pressure used in Step (B) is at least one pressure chosen from 20 torr absolute to 0.02 torr absolute, or 10 torr absolute to 0.02 torr absolute, or 5 torr absolute to 0.02 torr absolute, or 3 torr absolute to 0.02 torr absolute; or 20 torr absolute to 0.1 torr absolute; or 10 torr absolute to 0.1 torr absolute; or 5 torr absolute to 0.1 torr absolute; or 3 torr absolute to 0.1 torr absolute.

The molar ratio of hydroxyl bearing component to the acid component can be adjusted to within 1.0-1.5/1.0; or 1.01-1.5/1.0; 1.01-1.3/1.0; or 1.01-1.2/1.0; or 1.01-1.15/1.0; or 1.01-1.01-1.10/1.0; or 1.03-1.51, or 1.0; or 1.03-1.3/1.0; or 1.03-1.2/1.0; or 1.03-1.151, or 1.0; or 1.03-1.10/1.0; or 1.05-1.5/1.0; 1.05-1.31, or 1.05-1.2/1.0; or 1.05-1.15/1.0; or 1.05-1.15/1.0; or 1.05-1.10/1.0.

The heating or residence time of the copolyester melt in Step (B), or in the finisher vessel, may be from 1 to 6 hours, or 1 to 5 hours, or 1 to 4 hours, or 1 to 3 hours, 1.5 to 3 hours, or 1 to 2 hours.

The reaction temperature of the copolyester in Step B, or in the finisher vessel (as determined by either the set point temperature or the actual internals temperature) should be at least 275° C., and can also be at least 278° C., or at least 279° C., or at least 280° C., or at least 283° C., or at least 285° C., or at least 287° C., or at least 289° C., or at least 290° C., or at least 292° C., and up to 310° C., or up to 305° C., or up to 300° C., or up to 295° C., or up to 292° C., or up to 290° C., or up to 289° C., or up to 287° C.

In the process of the invention, the copolyester can be obtained by process comprising:

a) polycondensing a copolyester melt, comprising residues of NPG and residues of TACD, to an IV of at least 0.55 dL/g in the presence of alkali or alkaline earth metal atoms, aluminum atoms, and tin atoms to obtain a high IV copolyester melt;

b) converting the high IV copolyester melt into amorphous copolyester particles having a Tg of a least 90° C.

There is also provided a process for making a copolyester composition comprising polycondensing a copolyester melt, comprising residues of NPG and residues of TACD, to an IV of at least 0.55 dL/g in at a temperature of at least 275° C. and converting copolyester melt into amorphous copolyester particles having a Tg of a least 90° C. and which are thermally stable.

It is desirable to feed one or more dicarboxylic acids, preferably aromatic dicarboxylic acids, or ester forming derivatives thereof, and one or more of the hydroxyl component continuously to an esterification reactor operated at a temperature of between about 150° C. and 250° C., and at a super-atmospheric pressure of between about 0 psig to 750 psig. The residence time of the reactants typically ranges from between about one and six hours. Normally, the esterification or trans-esterification reaction is continued desirably until a an acid or ester group conversion of at least 70% is achieved, but more typically until an acid or ester group conversion of at least 85% is achieved to make the desired oligomeric mixture.

Water is removed as the esterification reaction proceeds in order to drive the equilibrium toward the desired products. Methanol is removed as the ester exchange reaction of a dimethyl ester of a dicarboxylic acid proceeds in order to drive the equilibrium toward the desired products.

The esterification zone typically produces the oligomer species, if any, continuously in a series of one or more reactors. Alternately, the oligomer species in the oligomeric mixture could be produced in one or more batch reactors. At this stage, the It.V. is usually not measurable or is less than 0.1 dL/g. The average degree of polymerization of the molten oligomeric mixture is typically less than 15, and often less than 7.0.

Desirably, Step A or the esterification or transesterification reaction, or the whole melt phase process (includes esterification or ester exchange and polycondensation) reaction proceeds in the absence of added titanium compounds.

Once the oligomeric mixture is made to the desired percent conversion of the acid or ester groups, it is transported from the esterification zone or reactors to the polycondensation zone (Step B). The commencement of the polycondensation reaction is generally marked by either a higher actual operating temperature than the operating temperature in the esterification zone, or a marked reduction in pressure (usually sub-atmospheric) compared to the esterification zone, or both. Typical polycondensation reactions occur at temperatures ranging from about 230° C. and 320° C., and at sub-atmospheric pressure of between less than 760 torr to about 0.2 torr. The residence time of the reactants during polycondensation typically ranges from between about 2 to about 6 hours.

In some processes, polycondensation reactions are initiated and continued in the melt phase in a prepolymerization zone and finished in the melt phase in a finishing zone, after which the melt is solidified to form the copolyester polymer melt phase product, generally in the form of chips, pellets, or any other shape.

The temperature applied to the polymer melt or of the polymer melt in at least a portion of the polycondensation zone is desirably greater than 260° and less than about 290° C. The pressure in the final reactor (or finishing zone) may be within the range of about 0.2 to 20 mm torr, or 0.2 to 10 torr, or 0.2 to 2 torr.

It is desired that the aluminum compound and the alkali or alkaline earth metal compound are added close together e.g. both before the It.V. of the melt reaches 0.2 dL/g, or 0.1 dL/g, or before an increase of 0.1 dL/g after exiting the last esterification reactor, or before entering the first polycondensation reaction vessel). The aluminum, alkali or alkaline earth metal and tin atoms can be added during Step (A), or added together prior to the polycondensation zone, or added together before the I.V. of the melt phase product is 0.2 dL/g, or added before esterification or trans-esterification is 85% complete (by time) or before 75% completion or before 50% completion or before 30% completion each by time. Preferably, the tin catalyst is added at the start of ester exchange to maximize TMCD incorporation followed by a later addition of the Li/Al catalysts added together The aluminum compound and the alkali or alkaline earth metal compound can be heated together prior to introduction into a melt-phase copolyester manufacturing line. Since aluminum operates as part of the polycondensation catalyst system, it is desirable to add aluminum to the melt phase manufacture early, such as before the polycondensation zone, to provide the benefit of shorter reaction time and/or a higher molecular weight build-up. An aluminum compound is added preferably together with reactants at the onset of the esterification reaction or step A, and prior to entery of the oligomer mixture into the polycondensation zone or Step (B); or alternatively, no later than when the It.V. of the melt reaches 0.3 dL/g, or no later than when the It.V. of the melt reaches 0.2 dL/g.

Once the polymer molecular weight is built to the desired degree, it is discharged from the final polycondensation reactor, in this case a finisher, to be pelletized. A gear pump may be utilized to facilitate funneling an amount of bulk polymer through a conduit to exit from finishing vessel.

It is to be understood that the melt phase process conditions and reactor configurations described above are illustrative of a melt phase process, and that the invention is not limited to this illustrative process. For example, while reference has been made to a variety of operating conditions at certain discrete It.V. values, differing process conditions may be implemented inside or outside of the stated It.V. values, or the stated operating conditions may be applied at It.V. points in the melt other than as stated. Moreover, one may adjust the process conditions based on reaction time instead of measuring or predicting the It.V. of the melt. The process is also not limited to the use of tank reactors in series or parallel or to the use of different vessels for each zone.

The melt phase product is processed to a desired form, such as amorphous particles. The shape of the copolyester polymer particles is not limited, and can include regular or irregular shaped discrete particles without limitation on their dimensions, including stars, spheres, particles, globoids, cylindrically shaped pellets, conventional pellets, pastilles, and any other shape, but particles are distinguished from a sheet, film, preforms, strands or fibers.

The method for solidifying the copolyester polymer from the melt phase process is not limited. For example, molten copolyester polymer from the melt phase process may be directed through a die, or merely cut, or both directed through a die followed by cutting the molten polymer. A gear pump may be used as the motive force to drive the molten copolyester polymer through the die. Instead of using a gear pump, the molten copolyester polymer may be fed into a single or twin screw extruder and extruded through a die, optionally at a temperature of 190° C. or more at the extruder nozzle. Once through the die, the copolyester polymer can be drawn into strands, contacted with a cool fluid, and cut into pellets, or the polymer can be pelletized at the die head, optionally underwater. The copolyester polymer melt is optionally filtered to remove particulates over a designated size before being cut. Any conventional hot pelletization or dicing method and apparatus can be used, including but not limited to dicing, strand pelletizing and strand (forced conveyance) pelletizing, pastillators, water ring pelletizers, hot face pelletizers, underwater pelletizers and centrifuged pelletizers.

The particles can be spheroidal in shape by cutting the molten copolyester underfluid (e.g. underwater) at the die head as the molten polymer is extruded through the die head. This process can be differentiated form strand cutting operations where the extruded polymer is fed into a water bath, allowed to cool and then the strands are cut after the polymer is solidified in the strand form.

Articles can be formed from the solid products produced by the process of the invention by any conventional techniques known to those of skill. For example, the melt phase products are fed to a machine for melt extruding and injection molding the melt into shapes such as preforms suitable for stretch blow molding into beverage or food containers, or a machine for injection molding, or a machine for merely extruding into other forms such as sheet. Suitable processes for forming the articles are known and include extrusion, extrusion blow molding, melt casting, injection molding, a melt to mold process, stretch blow molding (SBM), thermoforming, and the like.

Examples of the kinds of shaped articles which can be formed from the melt phase products and the copolyester polymer composition of the invention include sheet; film; packaging and containers such as preforms, bottles, jars, and trays; rods; tubes; lids; and filaments and fibers. Beverage bottles made from polyethylene terephthalate suitable for holding water or carbonated beverages, and heat-set beverage bottles suitable for holding beverages which are hot filled into the bottles are examples of the types of bottles which are made from the crystallized pellet of the invention. Examples of trays are those which are dual ovenable and other CPET trays. The copolyester polymers can be used in various types of film and/or sheet, including but not limited to extruded film(s) and/or sheet(s), calendered film(s) and/or sheet(s), compression molded film(s) and/or sheet(s), solution casted film(s) and/or sheet(s). Methods of making film and/or sheet include but are not limited to extrusion, calendering, compression molding, and solution casting.

Copolyester blends comprising the copolyester and a polymer or ingredient other than the copolyester can be made. Copolyester blends may contain from 0.01 to 25% by weight of the overall composition common additives such as colorants, dyes, mold release agents, flame retardants, plasticizers, nucleating agents, stabilizers, including but not limited to, UV stabilizers, thermal stabilizers and/or reaction products thereof, fillers, and impact modifiers. Examples of typical commercially available impact modifiers well known in the art and useful in this invention include, but are not limited to, ethylene/propylene terpolymers, functionalized polyolefins such as those containing methyl acrylate and/or glycidyl methacrylate, styrene-based block copolymeric impact modifiers, and various acrylic core/shell type impact modifiers. Residues of such additives are also contemplated as part of the copolyester composition Reinforcing materials may be useful in the polymer blends of this invention. The reinforcing materials may include, but are not limited to, carbon filaments, silicates, mica, clay, talc, titanium dioxide, Wollastonite, glass flakes, glass beads and fibers, and polymeric fibers and combinations thereof. In one embodiment, the reinforcing materials include glass, such as, fibrous glass filaments, mixtures of glass and talc, glass and mica, and glass and polymeric fibers.

The copolyesters of the invention are desirably thermally stable. The weight average molecular weight (Mw) of a dry copolyester is measured before melting and then again after remelting to determine its thermal stability. Desirably, the copolyesters of the invention are thermally stable, meaning that the weight average molecular weight (Mw) of the copolyesters of the invention after heating in a nitrogen atmosphere at 310° C. and holding the sample molten for 25 minutes is 15,000 or higher as determined by the GPC method described below. The Mw average molecular weight can be at least 17,000, or at least 18,000, or at least 19,000, or at least 20,000, or at least 21,000.

For the purpose of determining whether the copolyester is thermally stable, the following test method may be employed. Approximately 200 mg of dried polymer granules with a particle size of 3 mm or less are placed in a dry GC headspace vial. A screw type cap with a septa insert is firmly attached to the vial to insure a good seal. The contents are purged with nitrogen by first piercing the septa with an open 18 gauge hypodermic needle that served as an exhaust. A second 18 gauge needle attached to an open nitrogen line with an adapter and Tygon tubing is inserted through the septum. Purging is performed for one minute to provide an inert atmosphere. A total of 6 vials/experiment are prepared in this manner. The vials are then placed in a heating block at 310° C. and extracted after 0, 5, 10, 15, 20 and 25 minutes. After cooling to room temperature, the samples are submitted for Gel Permeation Chromatography (GPC) where their molecular weight distribution is measured. GPC is performed on an Agilent Series 1200 series LC instrument consisting of a degasser, an isocratic pump, an auto sampler and a UV detector. Each sample is dissolved in a solvent system made up of 95/5 by volume methylene chloride/hexafluoroisopropanol+ 0.5 g/L tetraethylammonium bromide. Samples are analyzed under the following conditions:

Temperature: ambient
Flow rate: 1.0 ml/min
Sample solution: 6 mg NPG/TMCD copolyester in 10 ml methylene chloride/hexafluoroisopropanol azeotrope (~70/30 by vol)+10 µl toluene flow rate marker.
Injection volume: 10 µl
Column set: Polymer Laboratories 5 µm PLgel, Guard+ Mixed C
Detection: UV absorbance at 255 nm
Calibrants: monodisperse polystyrene standards, MW=580 to 4,000,000 and 1-phenyl-Hexane MW=162
Universal calibration parameters:
Polystyrene PS K=0.1278 a=0.7089
Polycyclohexylene dimethylene terephthalate PCT K=0.23568 a=0.8405

(Note) The universal calibration parameters above are determined by linear regression to yield the correct weight average molecular weights for a set of five PCT samples previously characterized by light scattering.

Using the above described method, a molecular weight loss (MWL) can also be calculated and is determined by the difference between the starting average molecular weight (Mw) before exposure (t=0) and the Mw after 25 minutes at 310° C. From this, a % MWL is calculated for each copolyester.

The amorphous copolyester composition is capable of having a molecular weight loss of less than 25% as determined by measuring the molecular weight difference between a dried (at 80C for at least 24 hours) polymer having a molecular weight measured at ambient conditions before a first melting and the molecular weight of the same polymer sample after melting it for 25 minutes at a temperature of 310° C. in a nitrogen atmosphere. The MWL can be as low as no more than 20%, or no more than 18%, or no more than 15%, or no more than 13%, or no more than 11%, or no more than 10%, or no more than 9%, or no more than 8%.

The copolyesters of the invention desirably also have good melt viscosity stability reported as a melt viscosity loss ("MVL") of less than 50%, or less than 35%, or no more than 30%, or no more than 25%. The melt viscosity stability is also another measure of thermal stability. The melt stability of copolyesters can be determined by measuring the melt viscosity loss at a constant temperature and shear rate over a fixed period of time. Desirably, the copolyesters of this invention have a melt viscosity of 1,000 Poise or greater when tested on a Rheometrics Dynamic Analyzer (RDAII) at a constant temperature of 300° C. with a 10% strain at a constant frequency of 25 rad/sec after 20 minutes in air. Prior to testing, the polymer is ground to a particle size of 3 mm or less and then dried under vacuum at a temperature close to its glass transition temperature (Tg) for a minimum of 16 hours. The melt viscosity (Poise) of a sample with an approximate weight of 2 grams is measured at 0 and after 20 minutes under the above conditions. The % melt viscosity loss (MVL) is calculated from the 0 and 20 minute data.

The copolyesters of the invention desirably have a low off-gas rate. Desirably, the copolyesters have an off-gas rate of 2.5 ug/g/min or less, or 1.5 µg/g/min or less, or less than 1.25 µg/g/min, or less than 1.10 µg/g/min, or less than 1.00 µg/g/min, or less than 0.90 µg/g/min, or less than 0.80 µg/g/min, or less than 0.70 µg/g/min, or less than 0.60 µg/g/min, when tested using a sample weight of 2 grams under the following test conditions.

The method is a capillary gas chromatographic procedure for the determination of the rate of CO and $CO_2$ off-gassing produced by heating copolyesters. With this method, a known amount of dried copolyester is sealed in a headspace GC vial, purged under nitrogen and heated. The gas above the sealed sample is analyzed by an external standard method using a dual channel gas chromatagraph.

The lab apparatus for this testing procedure consists of the following:
Dual channel Micro GC
Headspace sampler
Chromatography data system
Module with thermal conductivity detector and divinylbenzene/ethylene glycol dimethylacryalte capillary column, 8-m×320-µm id with film thickness=30 µm
Module with thermal conductivity detector and 5 Å molecular sieve zeolite capillary column, 10-m×320-µm id with film thickness=12 µm Oven for drying samples
Vials, 20-mL, headspace, screw-top
Septum caps, headspace, screw-top
17.5-mm PTFE-Silicone Septa
Teflon Tape
B-D 21G1 needle
Hose with needle attachment connected to nitrogen source Prior to testing, the copolyester is dried at 60° C. for a minimum of 2 hours. Approximately 2.00 grams (±0.02) grams of dried sample are placed in a dry 20-mL headspace vial. The sample weight is recorded to the nearest 0.0001 grams Teflon tape is wrapped around the threaded top of the vial to which a screw top cap containing a 17.5 mm PTFE-silicone septum if securely attached. Another section of Teflon tape is then wrapped around the cap and top of vial. The septum is pierced first with a 21 gauge needle to serve as a vent and then with a second needle attached to a hose and nitrogen source. The nitrogen flow is turned on low and the vial is purged with nitrogen for 3-5 minutes. Afterwards, the vent needle is removed first and then the needle attached to the nitrogen flow. Purged sample vials are then placed in an auto sampler tray where they are transferred and inserted into a heating block at 300° C. As the sample is heated, the gas above the molten polymer is sampled 19 times over a one hour and 5 minute period. The ppm CO and $CO_2$ are calculated for each sample using the data system software or optionally by the following equation.

$$\text{ppm of sample component} = \frac{\text{Area of sample component peak} \times RF \text{ of sample component}}{2 \text{ grams (Sample Weight)}}$$

The data are used to determine an off gas rate as ppm/min. Prior to sample analysis, a three point calibration at 1000, 5000, and 10000 ppm of CO and $CO_2$ is performed using known standards of each gas. Integration of the chromatograms and the concentrations of each gas are used to calculate a response factor for each sample component using the following equation.

$$RF \text{ of Sample Component} = \frac{\text{Concentration of Sample Component (for each level)}}{\text{Area of Sample Component (for each level)}}$$

The three response factors for each sample component are then averaged.

| INSTRUMENT CONDITIONS | |
| --- | --- |
| Channel A | |
| Injection Options | |
| Inject Time: | 100 msec |
| Post Run Time: | 0 sec |
| Sample Pump Type: | Timed |
| Sample Pump Interval: | 30 sec |
| Backflush Time: | 7 sec |
| Temperature Control Options | |
| Sample Inlet: | On at 100 deg C. |
| Injector: | On at 90 deg C. |
| Column: | On at 10 deg C. |
| Pressure Control Options | |
| Pressure Control: | On |
| Equilibration Time: | 0 sec |
| Column: | 32.00 psi (Carrier Gas: Helium) |
| Post Run: | 32.00 psi |
| Detector Options | |
| Filament On: | On |
| Autozero: | On |
| Sensitivity: | High |
| Acquisition Channel: | On |
| Sampling Frequency: | 20 Hz |
| Run Time: | 2 min |
| Acquisition Delay: | 0 min |
| Channel B | |
| Injection Options | |
| Inject Time: | 100 msec |
| Post Run Time: | 0 sec |
| Backflush Time: | 10 sec |
| Temperature Control Options | |
| Injector: | On at 90 deg C. |
| Column: | On at 90 deg C. |
| Pressure Control Options | |
| Pressure Control: | On |
| Equilibration Time: | 0 sec |
| Column: | 30.00 psi |
| Post Run: | 30.00 psi |
| Detector Options | |
| Filament On: | On |
| Autozero: | On |
| Sensitivity: | High |
| Acquisition Channel: | On |
| Sampling Frequency: | 20 Hz |
| Run Time: | 2 min |
| Acquisition Delay: | 0 min |
| Trigger Type | |
| External (for first injection) | |
| Not triggered (for remaining 18 injections) | |

| HEADSPACE CONDITIONS | |
| --- | --- |
| Cycle | HS-Inj |
| Syringe | 5.0 mL-HS |
| Sample Volume | 3.6 mL |
| Incubat Temp | OFF |
| Incubat Time | 00:00:04 |
| Agi Speed | 500 rpm |
| Agi On Time | 0 s |
| Agi Off Time | 0 s |
| Syringe Temp | OFF |
| Fill Speed | 1 mL/s |
| Pullup Del | 0 ms |
| Inject to | GC Inj 1 |
| Inject Speed | 920 nL/s |
| Pre Inj Del | 0 ms |
| Pst Inj Del | 0 ms |
| Syr Flushing | 00:00:00 |
| GC Runtime | 00:01:00 |

EXAMPLES

All polymerizations were conducted on a 0.40 mole scale using a Camile™ interfaced polymerization stand. In each case the desired amount of DMT, NPG and TMCD were added to a 500 ml polymerization flask. The flask was equipped with a nitrogen inlet and stainless steel stirrer. The contents were purged under nitrogen and then heated in a metal bath under a nitrogen sweep of 0.5 SCFH to sweep over the methanol byproduct during the ester exchange phase (EE) of the polymerization. In some cases, a 40 wt % TMCD methanol solution was used as starting material. In these instances, the polymerization flask was barely dipped in the heated metal bath until most of the charged methanol distilled over which took approximately 10 minutes. Afterwards, the flask was lowered until the molten metal covered the flask approximately ½ in. above the melt level in the flask. After the EE phase was complete, the flask was completely submerged in the metal bath. Vacuum was then applied to the system in order to build molecular weight. As the molecular weight/melt viscosity of the polymer increased in the finisher stage, the stirring speed was reduced to maintain good heat contact and surface renewal of the polymer melt.

Examples 1-18

High Temperature Preparation of NPG-TMCD Copolyesters

This method will be referred to as the high temperature preparation method. The material charges for the first successful run are as follows:

Charge to 500 ml Round Bottom Flask
Dimethyl terephthalate (0.40 mole)=77.7 g
Neopentyl glycol (0.30 mole)=31.3 g
2,2,4,4-tetramethylcyclobutanediol (0.30 mole)=43.3 g Butyltin tris-2-ethylhexanoate, lithium hydroxide monohydrate, aluminum isopropoxide and triphenyl phosphate were added to give the amounts reported in Table 2.

The process conditions for the high temperature preparation method are reported in Table 1:

TABLE 1

Polymerization Conditions for High Temperature Prep

| stage | Time (min.) | Temp (° C.) | Vac. (torr) | Stir (rpm) |
|---|---|---|---|---|
| 1 | 5 | 200 | 730 | 0 |
| 2 | 10 | 200 | 730 | 200 |
| 3 | 45 | 200 | 730 | 200 |
| 4 | 5 | 210 | 730 | 200 |
| 5 | 55 | 210 | 730 | 200 |
| 6 | 60 | 290 | 730 | 200 |
| 7 | 20 | 290 | 730 | 200 |
| 8 | 20 | 290 | 0.3 | 200 |
| 9 | 240 | 290 | 0.3 | 200 |
| 10 | 1 | 290 | 730 | 0 |
| | 461 | or | 7.7 hr | |

The above method was used for the initial successful runs. In some cases, slight variations in the hold times and/or prepolymer temperatures and/or the stirring speed were instituted, but the finisher temperature (290° C.) and time (240 minutes) shown in stage 9 were held constant.

Table 2 documents the analytical results of copolymers prepared using the high temperature preparation method with supporting examples 1-18.

TABLE 2

NPG-TMCD Copolyesters from High Temperature Prep
(Finisher Temperature = 290° C., Finisher Time = 4 hours)

| Ex. no. | TMCD Batch no. | It. V. (dL/g) | meas. in polymer mole % | | meas. in polymer % | | 2 nd heat Tg (° C.) | meas in polymer (ppm) | | | |
|---|---|---|---|---|---|---|---|---|---|---|---|
| | | | NPG | TMCD | c-TMCD | t-TMCD | | Sn | P | Li | Al |
| 1 | A | 0.390 | NDA | NDA | NDA | NDA | NDA | 50-c | 6-c | 0 | 0 |
| 2 | A | 0.338 | 55.2 | 44.6 | 51.5 | 48.5 | NDA | 100-c | 12-c | 0 | 0 |
| 3 | A | 0.782 | 65.9 | 32.8 | 60.5 | 39.5 | 103 | 63 | 8 | 43 | 38 |
| 4 | A | 0.742 | 57.6 | 40.2 | 60.0 | 40.0 | 111 | 66 | 7 | 42 | 34 |
| 5 | A | 0.731 | 49.8 | 48.7 | 59.6 | 40.4 | 121 | 55 | 7 | 40 | 35 |
| 6 | A | 0.666 | 59.3 | 39.7 | 60.3 | 39.7 | 111 | 63 | 11 | 22 | 49 |
| 7 | A | 0.748 | 59.4 | 39.4 | 61.2 | 38.9 | 112 | 57 | 4 | 31 | 24 |
| 8 | C | 0.711 | 59.1 | 39.3 | 77.0 | 23.0 | 114 | 31 | 4 | 31 | 48 |
| 9 | B | 0.648 | 62.5 | 36.0 | 73.4 | 26.7 | 108 | 37 | 3 | 26 | 51 |
| 10 | D | 0.744 | 62.8 | 35.5 | 70.0 | 30.0 | 108 | 31 | 3 | 27 | 53 |
| 11 | D | 0.226 | 67.3 | 32.6 | 69.8 | 30.2 | NDA | 30-c | 3-c | 25-c | 0 |
| 12 | D | 0.394 | 59.3 | 40.4 | 62.3 | 37.7 | NDA | 35-c | 4-c | 0 | 35-c |
| 13 | D | 0.690 | 66.7 | 31.6 | 70.5 | 29.5 | 102 | 0 | 0 | 32 | 57 |
| 14 | D | 0.693 | 62.6 | 36.1 | 70.4 | 29.6 | 108 | 31 | 4 | 31 | 53 |
| 15 | D | 0.687 | 78.9 | 18.2 | 66.7 | 33.3 | 89 | 34 | 3 | 27 | 39 |
| 16 | D | 0.571 | 25.3 | 72.8 | 66.3 | 33.8 | 156 | 32 | 5 | 27 | 50 |
| 17 | D | 0.668 | 60.3 | 36.4 | NDA | NDA | NDA | 33 | 4 | 26 | 38 |
| 18 | D | 0.840 | 63.9 | 34.7 | 69.7 | 30.0 | 107 | 13 | 0 | 32 | 59 |

NDA = No Data Available
c = charged levels of catalysts, not measured.

Table 2 illustrates many points of interest. Examples 3-10 and 13-18 show that a high temperature process in combination with an effective catalyst system (Sn/Li/Al/P, Sn/Li/Al, Li/Al) can be used to produce high IV copolyesters containing TMCD and NPG with a broad range of glass transition temperatures (Tg). Examples 3-7, 8-10, and 13-18 show that TMCD batches (A-D) containing different ratios of cis/trans isomers (%) can be used (A=42/58, B=58/42 C&D=53/47). Examples 1 and 2 show that a Sn/P catalyst system alone does not produce high IV polymer and that increasing Sn concentration appears to actually lower the IV. Examples 11 and 12 show that Sn/P in combination with either Li or Al alone does not produce high IV polymer. Example 13 and 18 show that high IV polymer can be obtained with Li/Al catalysts alone or in combination with low Sn (13 ppm). The addition of Sn catalyst increases TMCD incorporation.

Examples 19-45

Low Temperature Preparation of NPG-TMCD Copolyesters

Copolyesters were also prepared using a low temperature preparation method, which employed a lower finisher temperature (280° C.) and in most cases, less finisher time (3 hours). Some of the notable differences instituted during the low temperature prep were: more Sn catalyst, the addition of Zn or Ti cocatalysts, the elimination of P, lower glycol/acid mole ratio (MR) and longer hold times during ester exchange. The addition points of Li/Al, and Zn and Ti cocatalysts were varied from upfront to the midpoint of stage 3. The advantage of the low temperature prep is to increase TMCD yield by lowering TMCD excess and lessening the amount of TMCD lost due to chain end degradation. The trans isomer of TMCD degrades at elevated temperatures via an elimination reaction, which has the effect of enriching the cis TMCD isomer content in the finished copolyester.

The material charges for a typical low temperature prep are as follows:

Charge to 500 ml Round Bottom Flask
Dimethyl terephthalate or T (0.40 mole)=77.7 g
Neopentyl glycol or 11 (0.32 mole)=32.9 g
~40 wt % TMCD in methanol=83.4 g (33.4 g or 0.23 mole of TMCD)
Butyltin tris-2-ethylhexanoate, lithium hydroxide monohydrate, aluminum isopropoxide, zinc acetate and titanium tetraisopropoxide were added to give the amounts of catalyst metals measured in the finished polymers reported in Table 4.

The process conditions and reaction sequence for the low temperature preparation method are reported in Table 3

TABLE 3

Polymerization Conditions for Low Temperature Prep

| Stage no | Time (min) | Temp (° C.) | Vacuum (torr) | Stir rpm |
|---|---|---|---|---|
| 1 | 0.1 | 200 | 730 | 150 |
| 2 | 15 | 205 | 730 | 150 |
| 3 | 120 | 205 | 730 | 150 |
| 4 | 15 | 230 | 730 | 150 |
| 5 | 60 | 230 | 730 | 150 |
| 6 | 15 | 260 | 250 | 150 |
| 7 | 30 | 260 | 250 | 150 |
| 8 | 10 | 270 | 3.5 | 150 |
| 9 | 50 | 270 | 3.5 | 150 |
| 10 | 5 | 275 | 0.8 | 150 |
| 11 | 45 | 275 | 0.8 | 150 |
| 12 | 5 | 280 | 0.8 | 150 |
| 13 | 240 | 280 | 0.8 | 150 |
| 14 | 3 | 290 | 730 | 0 |
| | 613.1 | min or | 10.2 hr | |

The same basic polymerization techniques were used for both the low and high temperature prep methods.

Table 4 documents the analytical results of copolymers prepared using the low temperature preparation method with supporting examples 19-45.

TABLE 4

NPG-TMCD Copolyesters from Low Temperature Prep
(Finisher Temperature = 280° C.)

| Ex. no. | Finisher time (hr) | It. V. (dL/g) | meas. In polymer (mole %) | | meas. In polymer (%) | | meas. in polymer (ppm) | | | | |
|---|---|---|---|---|---|---|---|---|---|---|---|
| | | | NPG | TMCD | c-TMCD | t-TMCD | Sn | Li | Al | Zn | Ti |
| 19 | 3 | 0.683 | 67.5 | 30.9 | 61.8 | 38.2 | 0 | 35 | 51 | 0 | 0 |
| 20 | 3 | 0.670 | 68.4 | 29.6 | 62.6 | 37.4 | 0 | 31 | 59 | 0 | 5 |
| 21 | 4 | 0.620 | 62.4 | 32.5 | 62.4 | 37.6 | 0 | 24 | 37 | 77 | 0 |
| 22 | 4 | 0.665 | 64.0 | 34.8 | 60.7 | 39.3 | 47 | 24 | 35 | 0 | 0 |
| 23 | 4 | 0.628 | 62.6 | 36.4 | 59.6 | 40.5 | 75 | 21 | 40 | 0 | 0 |
| 24 | 4 | 0.575 | 60.7 | 38.4 | 56.8 | 43.2 | 155 | 22 | 32 | 0 | 0 |
| 25 | 3.5 | 0.707 | 56.6 | 41.7 | 58.3 | 41.7 | 67 | 28-l | 42-l | 0 | 0 |
| 26 | 3 | 0.681 | 56.1 | 42.1 | 57.8 | 42.2 | 70 | 29-l | 44-l | 0 | 0 |
| 27 | 3.5 | 0.701 | 56.4 | 41.8 | 58.3 | 41.7 | 71 | 28 | 45 | 0 | 0 |
| 28 | 3.5 | 0.743 | 56.8 | 41.6 | 58.0 | 42.0 | 56 | 29-l | 27-l | 0 | 0 |
| 29 | 3.5 | 0.731 | 55.9 | 42.6 | 57.7 | 42.3 | 56 | 29 | 19 | 0 | 0 |
| 30 | 3.5 | 0.788 | 56.2 | 42.3 | 57.9 | 42.1 | 55 | 31-l | 42-l | 0 | 0 |
| 31 | 3.5 | 0.704 | 56.0 | 42.9 | 57.6 | 42.4 | 53 | 20-l | 30-l | 0 | 0 |
| 32 | 3.5 | 0.716 | 55.5 | 43.4 | 57.1 | 42.9 | 71 | 19-l | 22-l | 0 | 0 |
| 33 | 3.5 | 0.650 | 59.6 | 39.0 | 60.9 | 39.1 | 50 | 19-l | 24-l | 0 | 0 |
| 34 | 3.5 | 0.740 | 58.0 | 40.6 | 57.8 | 42.2 | 57 | 21-l | 28-l | 0 | 0 |
| 35 | 3.5 | 0.738 | 57.6 | 41.0 | 57.7 | 42.4 | 58 | 21-l | 25-l | 0 | 0 |
| 36 | 3.5 | 0.692 | 58.1 | 40.4 | 58.1 | 41.9 | 55 | 20-l | 27-l | 0 | 0 |
| 37 | 3 | 0.704 | 62.0 | 36.1 | 59.4 | 40.6 | 56 | 34-l | 53-l | 0 | 0 |
| 38 | 3 | 0.701 | 62.4 | 36.3 | 59.8 | 40.2 | 59 | 30-l | 44-l | 41-l | 0 |
| 39 | 3 | 0.711 | 60.8 | 37.4 | 58.8 | 41.2 | 60 | 34-l | 50-l | 37-l | 0 |
| 40 | 3 | 0.674 | 60.9 | 37.4 | 58.9 | 41.1 | 53 | 32-l | 27-l | 41-l | 0 |
| 41 | 3 | 0.657 | 60.1 | 38.2 | 58.5 | 41.5 | 36 | 27-l | 50-l | 41 | 0 |
| 42 | 3.5 | 0.768 | 56.9 | 41.4 | 58.0 | 42.0 | 58 | 23-l | 27-l | 0 | 5 |
| 43 | 3.5 | 0.722 | 58.3 | 40.4 | 58.3 | 41.7 | 60 | 23-l | 27-l | 0 | 10-l |
| 44 | 3.5 | 0.462 | 58.0 | 41.6 | 55.9 | 44.1 | 58 | 0 | 0 | 0 | 9-l |
| 45 | 3.5 | 0.433 | 58.3 | 41.0 | 55.6 | 44.4 | 54 | 0 | 0 | 0 | 13-l | l = late additions (after 60 minutes at 205° C.)

Examples (19-21) in Table 4 show that acceptably high IV copolymer containing NPG and TMCD can be prepared with Li/Al, Li/Al/Ti and Li/Al/Zn catalyst combinations. Examples 19, 22, 23 & 24 were prepared using the same charges of NPG and TMCD to show the effect of Sn catalyst concentration on TMCD incorporation. Higher Sn resulted in more TMCD incorporation, but lower IV. High catalyst loadings of Sn alone or Sn with Li/Al added upfront to the paste appeared to cause foaming, which is undesirable. Examples 25-43 show that adding Sn upfront, followed by later additions of Li/Al, Li/Al/Zn or Li/Al/Ti help increase IV, reduce finisher time and lessen the chance of foaming. Examples 44 and 45 show that a catalyst combination of Sn/Ti alone does not produce high IV polymer.

Examples 46-49

NPG-TMCD Copolyesters Containing CHDM

Copolyesters of DMT, NPG and TMCD were also prepared containing 1,4-cyclohexanedimethanol (CHDM). A low temperature preparation method in combination with Sn, Li, Al catalysts were used to successfully prepare copolyesters with 3-11 mole % CHDM. The material charges for a typical run containing low CHDM are shown below along with polymerization conditions in Table 5.

Charge to 500 ml Round Bottom Flask
Dimethyl terephthalate or T (0.40 mole)=77.7 g
Neopentyl glycol or 11 (0.28 mole)=29.2 g
~40 wt % TMCD in methanol=79.3 g (31.7 g or 0.22 mole of TMCD)
1,4-cyclohexanedimethanol (0.014 mole)=2.00 g
Butyltin tris-2-ethylhexanoate, lithium hydroxide monohydrate and aluminum isopropoxide were added to give the amounts of catalyst metals measured in the finished polymers reported in Table 6.

TABLE 5

Synthesis Procedure for NPG-TMCD Copolymers with CHDM

| Stage no. | Time (min.) | Temp (° C.) | Vacuum (torr.) | Stir (rpm) |
|---|---|---|---|---|
| 1 | 0.1 | 205 | 730 | 0 |
| 2 | 15 | 205 | 730 | 150 |
| 3 | 120 | 205 | 730 | 150 |
| 4 | 15 | 230 | 730 | 150 |
| 5 | 60 | 230 | 730 | 150 |
| 6 | 15 | 260 | 250 | 150 |
| 7 | 30 | 260 | 250 | 150 |
| 8 | 10 | 270 | 3.5 | 150 |
| 9 | 50 | 270 | 3.5 | 150 |
| 10 | 5 | 275 | 0.8 | 150 |
| 11 | 45 | 275 | 0.8 | 150 |
| 12 | 5 | 280 | 0.8 | 150 |
| 13 | 90 | 280 | 0.8 | 150 |
| 14 | 1 | 280 | 0.8 | 100 |
| 15 | 14 | 280 | 0.8 | 100 |
| 16 | 1 | 280 | 0.8 | 50 |
| 17 | 34 | 280 | 0.8 | 50 |
| 18 | 1 | 280 | 0.8 | 25 |
| 19 | 24 | 280 | 0.8 | 25 |
| 20 | 1 | 280 | 0.8 | 10 |
| 21 | 44 | 280 | 0.8 | 10 |
| 22 | 3 | 290 | 730 | 0 |
| 583.1 min | | or | 9.72 hr | |

Table 6 documents the analytical results of NPG-TMCD copolymers prepared containing CHDM with supporting examples 46-49.

TABLE 6

NPG-TMCD Copolyesters with CHDM

| Ex. no. | Finisher Temp (° C.) | It. V. (dL/g) | calculated (mole %) | | | 2nd heat Tg (° C.) | meas. in polymer (ppm) | | | |
|---|---|---|---|---|---|---|---|---|---|---|
| | | | NPG* | TMCD* | CHDM* | | Sn | P | Li | Al |
| 46 | 280-290 | 0.676 | 54.9 | 34.0 | 11.7 | 105 | 49 | 4 | 30 | 25 |
| 47 | 280 | 0.706 | 56.5 | 39.9 | 3.4 | 109 | 56 | 0 | 20-l | 27-l |
| 48 | 280 | 0.737 | 54.8 | 38.1 | 6.7 | 109 | 50 | 0 | 23-l | 25-l |
| 49 | 280 | 0.724 | 52.6 | 38.0 | 10.4 | 109 | 50 | 0 | 22-l | 28-l | l = late addition (added after 60 minutes in stage 3 of the polymerization conditions shown in Table 5).
*calculated values based on wt % measurement by gas chromatography. Accurate measurements of CHDM and NPG could not be determined by NMR due to peak overlap. All compositions that did not contain CHDM were determined by NMR.

Examples 50-53

TMCD Degradation

Table 7 shows the effect of finisher temperature and time on TMCD degradation. The starting cis/trans isomer ratio (%) of the incoming TMCD monomer was 53/47 (cis/trans). As can be seen by examples 50 and 51, the cis/trans ratio for finished polymers using the high temperature prep method was about 70/30. The high cis content is due to degradation of the trans isomer via an elimination reaction (which is a pathway not available to the cis isomer due to steric constraints). A higher cis/trans ratio in the finished polymer compared to that of the starting monomer is an indication of the undesired degradation of the trans-isomer to non-reactive byproducts. Examples 52 and 53 show copolyesters prepared using the low temperature prep method. The cis/trans ratio in these copolyesters was 60/40, indicating less trans-TMCD degradation.

TABLE 7

The Effect of Finisher Temperature on TMCD Chain End Degradation
(Finisher Time = 4 hours)

| Ex. no. | Finisher Temp. (° C.) | It. V. (dL/g) | meas. in polymer (mole %) | | meas. in polymer (%) | | meas. in polymer (ppm) | | | |
|---|---|---|---|---|---|---|---|---|---|---|
| | | | NPG | TMCD | c-TMCD | t-TMCD | Sn | P | Li | Al |
| 50 | 290 | 0.744 | 62.8 | 35.5 | 70.0 | 30.0 | 31 | 3 | 27 | 53 |
| 51 | 290 | 0.693 | 62.6 | 36.1 | 70.4 | 29.6 | 31 | 4 | 31 | 53 |

TABLE 7-continued

The Effect of Finisher Temperature on TMCD Chain End Degradation
(Finisher Time = 4 hours)

| Ex. no. | Finisher Temp. (° C.) | It. V. (dL/g) | meas. in polymer (mole %) | | meas. in polymer (%) | | meas. in polymer (ppm) | | | |
|---|---|---|---|---|---|---|---|---|---|---|
| | | | NPG | TMCD | c-TMCD | t-TMCD | Sn | P | Li | Al |
| 52 | 280 | 0.628 | 62.6 | 36.4 | 59.6 | 40.4 | 75 | 0 | 21 | 40 |
| 53 | 280 | 0.665 | 64.0 | 34.8 | 60.7 | 39.3 | 47 | 0 | 24 | 35 |

Examples 54-60

Scale Up Experiments

NPG/TMCD copolyesters were prepared in a pilot plant using a 30-lb batch style reactor (Unit HV). The batches required very long finisher times to obtain acceptable It.V's of >0.556 dL/g or greater for testing. The thermal stability and off gassing behavior were evaluated in the same manner as that described for the lab prep materials. The procedures for successful pilot plant runs are described below. Table 8 reports the batch analytical data.

Example 54

21.24 lbs dimethyl terephthalate, 10.25 lbs neopentyl glycol and 8.52 lbs 2,2,4,4-tetramethyl-1,3-cyclobutanediol were reacted together in the presence of butyltin tris(2-ethylhexanoate), triphenyl phosphate, lithium hydroxide monohydrate and aluminum isopropoxide to give the amounts of catalyst metals measured in the finished polymers reported in Table 8. The catalysts were charged in a 50/50 mixture of ethylene glycol/neopentyl glycol with approximate concentrations of 0.20 wt % Sn, 0.21 wt % Al, 0.15 wt % Li and 0.015 wt % P. The reaction was carried out under a nitrogen gas purge of 10 SCFH in an 18 gallon stainless steel pressure vessel fitted with a condensing column, a vacuum system, and a HELICONE-type agitator. The contents were heated to 50° C. and the agitator was started at 25 rpm in the forward direction. Heating and stirring were continued for 2.25 hrs until the reaction temperature was 290° C. The temperature was held at 290° C. for 30 minutes with the agitator operating at 25 rpm for 6 minutes in the forward direction and 6 minutes in the reverse direction. The pressure was then reduced at a rate of 13 mm Hg/minute to full vacuum. When the pressure dropped below 3.6 mm Hg, the mixture was stirred at 25 rpm for 1 hr and then slowed to 15 rpm. The reaction continued at 290° C. at a pressure between 1.4 mm-0.90 mm Hg for 8 hours. Upon completion, the vessel was pressurized with $N_2$ to push the molten polymer through an extrusion die. The molten rods were pulled through a cold water bath to solidify them and chopped into ~⅛-inch pellets.

Example 55

23.47 lbs dimethyl terephthalate, 9.81 lbs neopentyl glycol and 12.19 lbs 2,2,4,4-tetramethyl-1,3-cyclobutanediol were reacted together in the presence of butyltin tris(2-ethylhexanoate), triphenyl phosphate, lithium hydroxide monohydrate and aluminum isopropoxide to give the amounts of catalyst metals measured in the finished polymers reported in Table 8. The catalysts were charged in a 50/50 mixture of ethylene glycol/neopentyl glycol with approximate concentrations of 0.20 wt % Sn, 0.20 wt % Al, 0.15 wt % Li and 0.014 wt % P. The reaction was carried out under a nitrogen gas purge of 10 SCFH in an 18 gallon stainless steel pressure vessel fitted with a condensing column, a vacuum system, and a HELICONE-type agitator. The contents were heated to 50° C. and the agitator was started at 25 rpm in the forward direction. Heating and stirring were continued for 1.33 hrs until the reaction temperature was 290° C. The temperature was held at 290° C. for 30 minutes with the agitator operating at 25 rpm for 6 minutes in the forward direction and 6 minutes in the reverse direction. The pressure was then reduced at a rate of 13 mm Hg/minute to full vacuum. When the pressure dropped below 2.5 mm Hg, the reaction proceeded at 25 rpm until the power draw to the agitator no longer increased (~8 hr). The pressure range during the 8 hour finisher time was 2.5 mm to 0.83 mm Hg. Upon completion, the vessel was pressurized with $N_2$ to push the molten polymer through an extrusion die. The molten rods were pulled through a cold water bath to solidify them and chopped into ~⅛-inch pellets.

Example 56

23.47 lbs dimethyl terephthalate, 8.18 lbs neopentyl glycol and 13.41 lbs 2,2,4,4-tetramethyl-1,3-cyclobutanediol were reacted together in the presence of butyltin tris(2-ethylhexanoate), triphenyl phosphate, lithium hydroxide monohydrate and aluminum isopropoxide to give the amounts of catalyst metals measured in the finished polymers reported in Table 8. The catalysts were charged in a 50/50 mixture of ethylene glycol/neopentyl glycol with approximate concentrations of 0.20 wt % Sn, 0.20 wt % Al, 0.15 wt % Li and 0.014 wt % P. The reaction was carried out under a nitrogen gas purge of 10 SCFH in an 18 gallon stainless steel pressure vessel fitted with a condensing column, a vacuum system, and a HELICONE-type agitator. The contents were heated to 50° C. and the agitator was started at 25 rpm in the forward direction. Heating and stirring were continued to 205° C. where the contents were held for 1 hour. The temperature was then increased to 290° C. and held for 30 minutes with the agitator operating at 25 rpm for 6 minutes in the forward direction and 6 minutes in the reverse direction. Afterwards, the pressure was reduced at a rate of 13 mm Hg/minute to full vacuum. When the pressure dropped below 3.9 mm Hg, wattmeter readings were observed until the power draw to the agitator no longer increased (~7.5 hr). At this time, the stir speed was reduced to 10 rpm and the reaction proceeded at 290° C. for 2 additional hours. The pressure range during the 9.5 hour finisher time was 3.9 mm to 0.79 mm Hg. Upon completion, the vessel was pressurized with $N_2$ to push the molten polymer through an extrusion die. The molten rods were pulled through a cold water bath to solidify them and chopped into ~⅛-inch pellets.

Example 57

23.47 lbs dimethyl terephthalate, 9.00 lbs neopentyl glycol and 10.60 lbs 2,2,4,4-tetramethyl-1,3-cyclobutanediol were reacted together in the presence of butyltin tris(2-ethylhexanoate) to give the amount of Sn measured in the finished polymer reported in Table 8. The reaction was carried out under a nitrogen gas purge of 10 SCFH in an 18 gallon stainless steel pressure vessel fitted with a condensing column, a vacuum system, and a HELICONE-type agitator. The contents were heated to 50° C. and the agitator was started at 25 rpm in the forward direction. Heating and stirring were continued to 205° C. where the contents were held for 1 hour. Afterwards, lithium hydroxide monohydrate and aluminum isopropoxide were added to give the amounts of Li and Al measured in the finished polymer reported in table 8. The Li and Al were added through the main catalyst charge port in a 50/50 mixture of ethylene glycol and neopentyl glycol with approximate concentrations of 0.16 wt % Li and 0.21 wt % Al. The catalyst charge port was then rinsed with n-butanol to ensure complete transfer of the catalysts. The reaction mixture was held for an additional hour at 205° C. and then heated to 230° C. and held for an hour. When the 230° C. hold time was complete, the mixture was heated to 260° C. and held for 0.5 hour with the agitator operating at 25 rpm for 6 minutes in the forward direction and 6 minutes in the reverse direction. Afterwards, the pressure was reduced at a rate of 13 mm Hg/minute to full vacuum while heating to 280° C. When the temperature reached 280° C. and the pressure dropped below 3.3 mm Hg, the mixture was stirred at 25 rpm for 9 hours. At this time, the power to the agitator appeared to peak so the stir speed was reduced to 15 rpm and the reaction continued for one hour. The pressure range during the 10 hour finisher time was 3.3 mm to 0.27 mm Hg. Upon completion, the vessel was pressurized with $N_2$ to push the molten polymer through an extrusion die. The molten rods were pulled through a cold water bath to solidify them and chopped into ~⅛-inch pellets.

Example 58

23.47 lbs dimethyl terephthalate, 9.00 lbs neopentyl glycol, 10.60 lbs 2,2,4,4-tetramethyl-1,3-cyclobutanediol and 0.50 lbs of 1,4-cyclohexanedimethanol were reacted together in the presence of butyltin tris(2-ethylhexanoate) to give the amount of Sn measured in the finished polymer reported in Table 8. The reaction was carried out under a nitrogen gas purge of 10 SCFH in an 18 gallon stainless steel pressure vessel fitted with a condensing column, a vacuum system, and a HELICONE-type agitator. The contents were heated to 50° C. and the agitator was started at 25 rpm in the forward direction. Heating and stirring were continued to 205° C. where the contents were held for 1 hour. Afterwards, lithium hydroxide monohydrate and aluminum isopropoxide were added to give the amounts of Li and Al measured in the finished polymer reported in table 8. The Li and Al were added through the main catalyst charge port in a 50/50 mixture of ethylene glycol and neopentyl glycol with approximate concentrations of 0.16 wt % Li and 0.21 wt % Al. The catalyst charge port was then rinsed with n-butanol to ensure complete transfer of the catalysts. The reaction mixture was held for an additional hour at 205° C. and then heated to 230° C. and held for an hour. When the 230° C. hold time was complete, the mixture was heated to 260° C. and held for 0.5 hour with the agitator operating at 25 rpm for 6 minutes in the forward direction and 6 minutes in the reverse direction. Afterwards, the pressure was reduced at a rate of 13 mm Hg/minute to full vacuum while heating to 280° C. When the temperature reached 280° C. and the pressure dropped below 2.7 mm Hg, the mixture was stirred at 25 rpm for 9 hours. The pressure range during the 9 hour finisher time was 2.7 mm to 0.26 mm Hg. Upon completion, the vessel was pressurized with $N_2$ to push the molten polymer through an extrusion die. The molten rods were pulled through a cold water bath to solidify them and chopped into ~⅛-inch pellets.

Example 59

23.47 lbs dimethyl terephthalate, 9.00 lbs neopentyl glycol, 10.60 lbs 2,2,4,4-tetramethyl-1,3-cyclobutanediol and 1.00 lbs of 1,4-cyclohexanedimethanol were reacted together in the presence butyltin tris(2-ethylhexanoate) to give the amount of Sn measured in the finished polymer reported in Table 8. The reaction was carried out under a nitrogen gas purge of 10 SCFH in an 18 gallon stainless steel pressure vessel fitted with a condensing column, a vacuum system, and a HELICONE-type agitator. The contents were heated to 50° C. and the agitator was started at 25 rpm in the forward direction. Heating and stirring were continued to 205° C. where the contents were held for 1 hour. Afterwards, lithium hydroxide monohydrate and aluminum isopropoxide were added to give the amounts of Li and Al measured in the finished polymer reported in table 8. The Li and Al were added through the main catalyst charge port in ethylene glycol with approximate concentrations of 0.32 wt % Li and 0.37 wt % Al. The catalyst charge port was then rinsed with n-butanol to ensure complete transfer of the catalysts. The reaction mixture was held for an additional hour at 205° C. and then heated to 230° C. and held for an hour. When the 230° C. hold time was complete, the mixture was heated to 260° C. and held for 0.5 hour with the agitator operating at 25 rpm for 6 minutes in the forward direction and 6 minutes in the reverse direction. Afterwards, the pressure was reduced at a rate of 13 mm Hg/minute to full vacuum while heating to 280° C. When the temperature reached 280° C. and the pressure dropped below 2.1 mm Hg, the mixture was stirred at 25 rpm for 9 hours. The pressure range during the 9 hour finisher time was 2.1 mm to 0.44 mm Hg. Upon completion, the vessel was pressurized with $N_2$ to push the molten polymer through an extrusion die. The molten rods were pulled through a cold water bath to solidify them and chopped into ~⅛-inch pellets.

Example 60

23.47 lbs dimethyl terephthalate, 9.00 lbs neopentyl glycol, and 10.60 lbs 2,2,4,4-tetramethyl-1,3-cyclobutanediol were reacted together in the presence of butyltin tris(2-ethylhexanoate) to give the amount of Sn measured in the finished polymer reported in Table 8. The reaction was carried out under a nitrogen gas purge of 10 SCFH in an 18 gallon stainless steel pressure vessel fitted with a condensing column, a vacuum system, and a HELICONE-type agitator. The contents were heated to 50° C. and the agitator was started at 25 rpm in the forward direction. Heating and stirring were continued to 205° C. where the contents were held for 1 hour. Afterwards, lithium hydroxide monohydrate and aluminum isopropoxide were added to give the amounts of Li and Al measured in the finished polymer reported in table 8. The Li and Al were added through the main catalyst charge port in ethylene glycol with approximate concentrations of 0.32 wt % Li and 0.37 wt % Al. The catalyst charge port was then rinsed with n-butanol to ensure complete transfer of the catalysts. The reaction mixture was held for an additional hour at 205° C. and then heated to 230° C. and held for an hour. When the 230° C. hold time was complete, the mixture was heated to 260° C. and held for 0.5 hour with the agitator operating at 25 rpm for 6 minutes in the forward direction and 6 minutes in the reverse direction. Afterwards, the pressure was reduced at a rate of 13 mm Hg/minute to full vacuum while heating to 280° C. When the temperature reached 280° C. and the pressure dropped below 4 mm Hg, the mixture was stirred at 25 rpm for 9 hours. The pressure range during the 9 hour finisher time was 4 mm to 0.17 mm Hg. Upon completion, the vessel was pressurized with $N_2$ to push the molten polymer through an extrusion die. The molten rods were pulled through a cold water bath to solidify them and chopped into ~⅛-inch pellets.

Table 8 documents the analytical results of NPG-TMCD copolyesters prepared in batch unit HV of the research Pilot Plant with supporting patent examples 54-60.

TABLE 8

Pilot Plant Batch Analytical Data

| Ex. no. | Finisher Temp (° C.) | Finisher Time (hr) | It. V. (dL/g) | meas. in polymer (mole %) | | | 2 nd heat Tg (° C.) | meas. In polymer (ppm) | | | |
|---|---|---|---|---|---|---|---|---|---|---|---|
| | | | | NPG | TMCD | CHDM | | Sn | P | Li | Al |
| 54 | 290 | 7.92 | 0.644 | 72.8 | 25.8 | 0.00 | 95 | 42 | 3 | 29 | 40 |
| 55 | 290 | 8.13 | 0.611 | 65.1 | 33.4 | 0.00 | 102 | 34 | 2 | 26 | 40 |
| 56 | 290 | 9.48 | 0.579 | 57.1 | 41.2 | 0.00 | 108 | 36 | 2 | 25 | 35 |
| 57 | 280 | 10.00 | 0.702 | 58.50 | 40.2 | 0.00 | 106 | 45 | 0 | 27-l | 30-l |
| 58 | 280 | 9.00 | 0.673 | *57.0 | *37.6 | *2.70 | 106 | 42 | 0 | 27-l | 36-l |
| 59 | 280 | 9.00 | 0.610 | *49.4 | *41.8 | *5.37 | 112 | 32 | 0 | 25-l | 30-l |
| 60 | 280 | 9.00 | 0.668 | 57.3 | 41.1 | 0.000 | 110 | 51 | 0 | 24-l | 31-l |

-l= late addition-(after holding at 205° C. for one hour. For more detail, see pilot plant procedures above.)
*calculated values based on wt % measurements by gas chromatography. Accurate measurements of CHDM and NPG could not be determined by NMR due to peak overlap. All compositions that did not contain CHDM were determined by NMR.
Note:
all batches contained small amount of ethylene glycol (<2 mole %) from the catalyst solution.

Examples 61-91

Thermal Stability

Table 9 documents the molecular weight loss of NPG-TMCD and CHDM-TMCD copolyesters after 25 minutes at 310° C. in a nitrogen atmosphere with patent examples 61-91.

TABLE 9

Molecular Weight at 310° C. at Time 0 and 25 Minutes

| Ex. no. | Prep type | meas. in polymer | | | meas. in polymer ppm | | | | | | 310 C. Mw t = 0 | 310 C. Mw t = 25 | 310 C. MWL |
|---|---|---|---|---|---|---|---|---|---|---|---|---|---|
| | | NPG | TMCD | CHDM | Sn | P | Li | Al | Ti | Zn | | | |
| 61 | Lab | 67.5 | 30.9 | 0.0 | 0 | 0 | 35 | 51 | 0 | 0 | 22257 | 18972 | 3285 |
| 62 | Lab | 68.4 | 29.6 | 0.0 | 0 | 0 | 31 | 59 | 5 | 0 | 22049 | 17231 | 4818 |
| 63 | Lab | 63.0 | 37.0 | 0.0 | 0 | 0 | 72 | 58 | 26 | 0 | 22197 | 15453 | 6744 |
| 64 | Lab | 70.0 | 26.4 | 0.0 | 0 | 0 | 31-l | 42-l | 33 | 0 | 26839 | 19538 | 7301 |
| 65 | Lab | 65.2 | 33.4 | 0.0 | 11 | 0 | 32 | 62 | 0 | 0 | 24346 | 22302 | 2044 |
| 66 | Lab | 63.9 | 34.7 | 0.0 | 13 | 0 | 32 | 59 | 0 | 0 | 30166 | 26919 | 3247 |
| 67 | Lab | 25.3 | 72.8 | 0.0 | 32 | 5 | 27 | 50 | 0 | 0 | 17697 | 16850 | 847 |
| 68 | Lab | 62.6 | 35.8 | 0.0 | 33 | 9? | 27 | 49 | 0 | 0 | 21110 | 19625 | 1485 |
| 69 | PP | 65.1 | 33.4 | 0.0 | 34 | 2 | 26 | 40 | 0 | 0 | 19489 | 17841 | 1648 |
| 70 | PP | 57.1 | 41.2 | 0.0 | 36 | 2 | 25 | 35 | 0 | 0 | 18091 | 16218 | 1873 |
| 71 | PP | 72.8 | 25.8 | 0.0 | 42 | 3 | 29 | 40 | 0 | 0 | 20992 | 19372 | 1620 |
| 72 | PP | 58.5 | 40.2 | 0.0 | 45 | 0 | 27-l | 30-l | 0 | 0 | 22634 | 19580 | 3054 |
| 73 | PP | 57.3 | 41.1 | 0.0 | 51 | 0 | 24-l | 31-l | 0 | 0 | 21317 | 18806 | 2511 |
| 74 | Lab | 49.8 | 48.7 | 0.0 | 55 | 7 | 40 | 35 | 0 | 0 | 23723 | 19010 | 4713 |
| 75 | Lab | 57.6 | 41.0 | 0.0 | 58 | 0 | 21-l | 25-l | 0 | 0 | 24272 | 18219 | 6053 |
| 76 | Lab | 65.9 | 32.8 | 0.0 | 63 | 8 | 43 | 38 | 0 | 0 | 25970 | 20031 | 5939 |
| 77 | Lab | 59.3 | 39.7 | 0.0 | 63 | 11 | 22 | 49 | 0 | 0 | 21445 | 18755 | 2690 |
| 78 | Lab | 57.6 | 40.2 | 0.0 | 66 | 7 | 42 | 34 | 0 | 0 | 23970 | 20333 | 3637 |
| 79 | Lab | 56.9 | 41.4 | 0.0 | 58 | 0 | 23-l | 27-l | 5-l | 0 | 25512 | 19359 | 6153 |
| 80 | Lab | 58.3 | 40.4 | 0.0 | 60 | 0 | 23-l | 27-l | 10-l | 0 | 23688 | 18073 | 5615 |
| 81 | Lab | 60.9 | 37.4 | 0.0 | 53 | 0 | 32-l | 27-l | 0 | 41-l | 22268 | 18245 | 4023 |
| 82 | Lab | 56.5* | 39.9* | 3.4* | 56 | 0 | 20 | 27 | 0 | 0 | 23359 | 19544 | 3815 |
| 83 | PP | 53.2* | 39.7* | 4.0* | 37 | 0 | 26-l | 33-l | 0 | 0 | 19925 | 17361 | 2564 |
| 84 | Lab | 54.8* | 38.1* | 6.7* | 50 | 0 | 23 | 25 | 0 | 0 | 24099 | 19093 | 5006 |
| 85 | Lab | 52.6* | 38.0* | 10.4* | 50 | 0 | 22 | 28 | 0 | 0 | 23386 | 18495 | 4891 |
| 86 | Lab | 54.9* | 34.0* | 11.7* | 49 | 4 | 30 | 25 | 0 | 0 | 21144 | 17970 | 3174 |
| 87 | lab | 0.0 | 34.6 | 62.4 | 58 | 6 | 20-l | 19-l | 0 | 0 | 17497 | 12674 | 4823 |
| 88 | lab | 0.0 | 33.3 | 65.8 | 67 | 9 | 20 | 56 | 0 | 0 | 18451 | 13079 | 5372 |
| 89 | PP | 0.0 | 21.4 | 75.9 | 194 | 14 | 0 | 0 | 0 | 0 | 19057 | 13218 | 5839 |

TABLE 9-continued

Molecular Weight at 310° C. at Time 0 and 25 Minutes

| Ex. no. | Prep type | meas. in polymer NPG | TMCD | CHDM | meas. in polymer ppm Sn | P | Li | Al | Ti | Zn | 310 C. Mw t = 0 | 310 C. Mw t = 25 | 310 C. MWL |
|---|---|---|---|---|---|---|---|---|---|---|---|---|---|
| 90 | prod. | 0.0 | 21.5 | 78.5 | 183 | 12 | 0 | 0 | 0 | 0 | 20825 | 13653 | 7172 |
| 91 | prod. | 0.0 | 35.0 | 65.0 | 168 | 11 | 0 | 0 | 0 | 0 | 18644 | 13382 | 5262 | t = time in minutes
PP = Pilot Plant Material
Prod. = Production Material
l = late addition (after 60 minutes at 205° C.)
*calculated levels based on GC wt % measurements
MWL = molecular weight loss (initial − final)

Examples 61-81 show that copolyesters containing NPG and TMCD maintain a weight average molecular weight (Mw) of 15,000 or greater after 25 minutes at 310° C. when prepared with catalyst systems of Li/Al, Sn/Li/Al, and optionally containing P, Ti and Zn. Examples 82-86 show that a Mw above 15,000 can also be maintained after 25 minutes at 310° C. if CHDM is added to NPG-TMCD copolyesters at up to 12 mole %. Examples 87 and 88 show that a Mw less than 15,000 after 25 minutes at 310° C. resulted when CHDM-TMCD copolyesters were prepared using a Sn/Li/Al/P catalyst system. Examples 89-91 show that a Mw of less than 15,000 after 25 minutes at 310° C. also resulted when production and pilot plant samples of CHDM-TMCD (prepared with high levels of Sn catalyst) were tested.

Examples 92-116

Off Gassing Performance

Off gassing can be a problem during high temperature film extrusion of CHDM-TMCD copolyesters. This behavior is thought to be caused by volatile degradation components attributed to CHDM and TMCD degradation and often results in splay defects in the sheet The off-gas results for NPG-TMCD copolyesters compared to CHDM-TMCD copolyesters are shown in Table 10 with patent examples 92-116.

TABLE 10

Off Gas Rates of NPG-TMCD copolyesters

| Ex. no. | Prep Type | Finisher Temp (° C.) | meas. in Polmer (mole %) NPG | TMCD | CHDM | meas. In Polymer (ppm) Sn | P | Li | Al | Ti | Zn | measured off gas (µg/g/min) CO | $CO_2$ | rate |
|---|---|---|---|---|---|---|---|---|---|---|---|---|---|---|
| 92 | lab | 290 | 65.9 | 32.8 | 0.0 | 63 | 8 | 43 | 38 | 0 | 0 | 0.155 | 0.280 | 0.435 |
| 93 | lab | 290 | 57.6 | 40.2 | 0.0 | 66 | 7 | 42 | 34 | 0 | 0 | 0.595-a | 0.376-a | 0.971-a |
| 94 | lab | 290 | 49.8 | 48.7 | 0.0 | 55 | 7 | 40 | 35 | 0 | 0 | 0.477-a | 0.337-a | 0.814-a |
| 95 | lab | 290 | 59.3 | 39.7 | 0.0 | 63 | 11 | 22 | 49 | 0 | 0 | 0.343 | 0.527 | 0.869 |
| 96 | lab | 290 | 59.4 | 39.4 | 0.0 | 57 | 4 | 31 | 24 | 0 | 0 | 0.252 | 0.461 | 0.659 |
| 97 | PP | 290 | 72.8 | 25.8 | 0.0 | 42 | 3 | 29 | 40 | 0 | 0 | 0.599 | 0.343 | 0.941 |
| 98 | PP | 290 | 65.1 | 33.4 | 0.0 | 34 | 2 | 26 | 40 | 0 | 0 | 0.416 | 0.352 | 0.768 |
| 99 | PP | 290 | 57.1 | 41.2 | 0.0 | 36 | 2 | 25 | 35 | 0 | 0 | 0.315 | 0.342 | 0.657 |
| 100 | lab | 280 | 57.6 | 41.0 | 0.0 | 58 | 0 | 21-l | 25-l | 0 | 0 | 0.994 | 0.629 | 1.623 |
| 101 | lab | 280 | 62.0 | 36.1 | 0.0 | 56 | 0 | 34-l | 53-l | 0 | 0 | 1.075 | 0.546 | 1.620 |
| 102 | PP | 280 | 58.5 | 40.2 | 0.0 | 45 | 0 | 27 | 30 | 0 | 0 | 0.696 | 0.789 | 1.486 |
| 103 | PP | 280 | 57.3 | 41.1 | 0.0 | 51 | 0 | 24 | 31 | 0 | 0 | 0.464 | 0.664 | 1.128 |
| 104 | lab | 280 | 62.4 | 36.3 | 0.0 | 59 | 0 | 30-l | 44-l | 0 | 41-l | 1.681 | 0.659 | 2.340 |
| 105 | lab | 280 | 60.8 | 37.4 | 0.0 | 60 | 0 | 34-l | 50-l | 0 | 37-l | 1.308 | 0.616 | 1.924 |
| 106 | lab | 280 | 60.9 | 37.4 | 0.0 | 53 | 0 | 32-l | 27-l | 0 | 41-l | 1.139 | 0.565 | 1.704 |
| 107 | lab | 280 | 56.9 | 41.4 | 0.0 | 58 | 0 | 23-l | 27-l | 5-l | 0 | 0.992 | 0.593 | 1.585 |
| 108 | lab | 280 | 58.3 | 40.4 | 0.0 | 60 | 0 | 23-l | 27-l | 10-l | 0 | 0.997 | 0.672 | 1.669 |
| 109 | lab | 280 | 56.5* | 39.9* | 3.4* | 56 | 0 | 20 | 27 | 0 | 0 | 1.033 | 0.644 | 1.677 |
| 110 | lab | 280 | 54.8* | 38.1* | 6.7* | 50 | 0 | 23 | 25 | 0 | 0 | 1.015 | 0.697 | 1.712 |
| 111 | lab | 280 | 52.6* | 38.0* | 10.4* | 50 | 0 | 22 | 28 | 0 | 0 | 1.061 | 0.848 | 1.909 |
| 112 | PP | 280 | 53.2* | 39.7* | 4.0* | 37 | 0 | 26 | 33 | 0 | 0 | 0.650 | 0.720 | 1.369 |
| 113 | PP | 285 | 0.0 | 21.4 | 0.0 | 194 | 14 | 0 | 0 | 0 | 0 | 4.707 | 3.827 | 8.588 |
| 114 | lab | 290 | 0.0 | 34.6 | 64.6 | 58 | 6 | 20 | 19 | 0 | 0 | 0.358 | 1.402 | 1.760 |
| 115 | prod. | 282-e | 0.0 | 21.5 | 78.5 | 183 | 12 | 0 | 0 | 0 | 0 | 1.264-a | 2.763-a | 4.027-a |
| 116 | prod. | 282-e | 0.0 | 35.0 | 65.0 | 168 | 11 | 0 | 0 | 0 | 0 | 1.137-a | 2.193-a | 3.330-a |

-e= estimates
-l= late addition (after 60 minutes at 205° C.)
-a= average of two separate measurements
PP = pilot plant
prod. = production samples
*= calculated levels based on GC wt % measurements Examples 92-99 show that NPG-TMCD copolyesters prepared with the Sn/Li/Al/P catalyst system at the highest finisher temperature (290° C.) had the lowest off gas rates. Examples 100-112 show that the off gas rate increased when the finisher temperature was lowered to 280° C. Examples 104-106 show that the addition of Zn cocatalyst at ~30-50 ppm resulted in slightly higher off gas rates. Examples 107 & 108 where low level Ti cocatalyst (5-10 ppm) was added did not appear to adversely affect the off gas rate. The off gas rates of all NPG-TMCD copolyesters prepared with Sn, Li, Al and optionally P, and Zn & Ti, cocatalysts were lower than Tritan™ TX-1000 and TX-2000 controls (Examples 115 & 116) which contain CHDM in place of NPG. Example 113, a Tritan™ TX-1000 control prepared in the Pilot Plant had the highest off gas rate. Example 114 shows that a CHDM-TMCD copolyester prepared at a high finisher temperature (290° C.) using low level Sn, Li, Al & P had a rate that was considerably lower than the ones prepared with very high Sn in combination with P (Examples 113, 115 & 116).

Examples 117-122

Melt Stability

Melt viscosity loss data are shown in Table 11 with supporting patent examples 117-122.

TABLE 11

| | | Melt Viscosity loss at 300° C. in air at 25 rad/sec | | | | | | | | |
|---|---|---|---|---|---|---|---|---|---|---|
| | | meas. in polymer | | | | meas. in polymer | | | Viscosity (Poise) | |
| Ex. | It. V. | mole % | | | Tg | (ppm) | | | 0 | 20 |
| no. | (dL/g) | NPG | *TMCD | CHDM | (° C.) | Sn | P | Li | Al | min. | min. | (MVL) |
| 117 | 0.721 | 0 | 21 | 79 | 108 | 194 | 14 | 0 | 0 | 1230 | 341 | 889 |
| 118 | 0.747 | 0 | 22 | 78 | 108 | 183 | 12 | 0 | 0 | 2230 | 695 | 1535 |
| 119 | 0.644 | 74 | 26 | 0 | 95 | 42 | 3 | 29 | 40 | 1560 | 1203 | 357 |
| 120 | 0.579 | 59 | 41 | 0 | 108 | 36 | 2 | 25 | 35 | 1873 | 1442 | 431 |
| 121 | 0.668 | 59 | 41 | 0 | 110 | 51 | 0 | 25-l | 30-l | 3619 | 2553 | 1066 |
| 122 | 0.642 | 56* | 40* | 4* | 106 | 37 | 0 | 26-l | 33-l | 2875 | 1990 | 885 |

Note:
Example 118 = Tritan™ TX-1000 sample.
-l= late addition (after 60 minutes at 205° C.)
Examples 117 and 119-122 are pilot plant prepared samples.
*= calculated levels based on GC wt % measurements Examples 117 and 118 show that the melt viscosity of 80 mole % CHDM/20 mole % TMCD copolyesters dropped to less than 1,000 Poise after 20 minutes at 300° C. in air regardless of whether it was a Tritan™ production sample (Ex. 118) or pilot plant sample (Ex. 117). Examples 119-121 show the melt viscosity of NPG-TMCD copolyesters prepared with Sn/Li/Al and optionally P maintained a melt viscosity greater than 1,000 Poise under the same conditions. Example 122 shows that a melt viscosity of greater than 1,000 Poise can also be maintained under the same conditions when low CHDM (4 mole %) is added to an NPG-TMCD copolyester.

What we claim is:
1. An article of manufacture comprising an amorphous copolyester composition comprising:
 a) residues of 2,2,4,4-tetraalkyl-1,3-cyclobutanediol (TACD);
 b) residues of neopentyl glycol (NPG);
 c) alkali metal atoms or alkaline earth metal atoms;
 d) aluminum atoms;
 e) tin atoms;
 f) an It.V. of at least 0.55 dL/g; and
 g) a Tg of at least 90° C.
2. The article of claim 1, wherein the copolyester is not solid state polymerized.
3. The article of claim 1, wherein the Tg of the copolyester is at least 100° C.
4. The article of claim 1, wherein the Tg of the copolyester is at least 105° C.
5. The article of claim 1, wherein the It.V. of the copolyester is at least 0.58 dL/g.
6. The article of claim 1, wherein the It.V. of the copolyester is at least 0.60 dL/g.
7. The article of claim 1, wherein the It.V. of the copolyester is at least 0.67 dL/g.
8. The article of claim 1, wherein the copolyester comprises less than 4 mole % residues of hydroxyl modifiers, based on the moles of all residues in the copolyester.
9. The article of claim 1, wherein the copolyester comprises less than 2 mole % residues of hydroxyl modifiers, based on the moles of all residues in the copolyester.
10. The article of claim 1, wherein no hydroxyl modifiers other than ethylene glycol are added to a melt phase process for manufacture of the copolyester composition, provided that if ethylene glycol is added to the melt phase process, it is added only as a carrier for one or more of the alkali metals or alkaline earth metals, aluminum, or tin atoms.
11. The article of claim 1, wherein the copolyester comprises less than 1 mole % residues of ethylene glycol, based on the moles of all residues in the copolyester.
12. The article of claim 1, wherein said TACD residue comprises the residue of a compound represented by the structure:

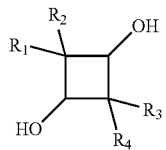

wherein $R_1$, $R_2$, $R_3$, and $R_4$ each independently represent an alkyl radical having 1 to 8 carbon atoms.
13. The article of claim 1, wherein the TACD residue comprises a residue of 2,2,4,4-tetramethylcyclobutane-1,3-diol, 2,2,4,4-tetraethylcyclobutane-1,3-diol, 2,2,4,4-tetra-n-propylcyclobutane-1,3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-dimethyl-4,4-diethylcyclobutane-1,3-diol, 2-ethyl-2,4,4-trimethylcyclobutane-1,3-diol, 2,4-dimethyl-2,4-diethyl-cyclobutane-1,3-diol, 2,4-dimethyl-2,4-di-n-propylcyclobutane-1,3-diol, 2,4-n-dibutyl-2,4-diethylcyclobutane-1,3-diol, 2,4-dimethyl-2,4-diisobutylcyclobutane-1,3-diol, 2,4-diethyl-2,4-diisoamylcyclobutane-1,3-diol, or mixtures thereof.

14. The article of claim 1, wherein the residues of NPG are present in the copolyester in an amount of at least 7 mole %, based on the moles of all residues in the copolyester.

15. The article of claim 1, wherein the residues of NPG are present in the copolyester in an amount ranging from 5 to 20 mole %, based on the moles of all residues in the copolyester.

16. The article of claim 1, wherein tin atoms are present in the copolyester in an amount of at least 10 ppm based on the weight of the copolyester polymer.

17. The article of claim 1, further comprising zinc atoms.

18. The article of claim 1, wherein the copolyester is made without the addition of a titanium catalyst to a melt phase process for the manufacture of the copolyester.

19. The article of claim 1, wherein the copolyester is made without the addition of any catalytically active metal or metal compounds other than said tin, aluminum, alkali metal or alkaline earth metal atoms, and optionally zinc.

20. The article of claim 1, wherein the copolyester comprises the residues of:
(a) an acid component comprising at least 80 mole % of the residues of terephthalic acid or residues of derivates of terephthalic acid; and
(b) a hydroxyl component comprising at least 80 mole % of the residues of NPG and TACD, cumulative;
based on 100 mole percent of acid component residues and 100 mole percent of hydroxyl component residues in the copolyester polymer.

21. The article of claim 20, wherein the copolyester comprises residues of:
(a) an acid component comprising at least 96 mole % terephthalate units; and
(b) a hydroxyl component comprising at least 96 mole residues of TACD and NPG, cumulative;
based on 100 mole percent of the acid component residues and 100 mole percent of the hydroxyl component residues in the copolyester polymer.

22. The article of claim 1, wherein the TACD residue comprises a residue of 2,2,4,4-tetramethylcyclobutane-1,3-diol ("TMCD").

23. The article of claim 22, wherein the mole % of residues of TMCD present in the copolyester, based on the moles of all residues in the copolyester, is at least 20 mole %.

24. The article of claim 22, wherein the mole % of residues of TMCD present in the copolyester, based on the moles of all residues in the copolyester, is at least 30 mole %.

25. The article of claim 1, wherein the copolyester comprises at least 15 ppm Al atoms, based on the weight of the copolyester.

26. The article of claim 25, comprising at least 30 ppm Al atoms based on the weight of the copolyester.

27. The article of claim 1, wherein the copolyester comprises alkali metal atoms, said alkali metal atoms comprising Li atoms.

28. The article of claim 27 wherein copolyester comprises Li atoms present in the copolyester in an amount ranging from 10 ppm to 60 ppm, based on the weight of the copolyester.

29. The article of claim 28, wherein the Li atoms are present in an amount ranging from 25 ppm to 50 ppm, based on the weight of the copolyester.

30. The article of claim 1, wherein said copolyester further comprises phosphorus atoms.

31. The article of claim 30, wherein said copolyester comprises phosphorus atoms present in an amount of at least 1 ppm.

32. A container comprising the copolyester of claim 1.

33. The article of claim 1, wherein said copolyester is thermally stable, defined as having a weight average molecular weight (Mw) of 15,000 or greater if measured by melting a dried sample of the copolyester (dried at 80° C. for at least 24 hours) in a nitrogen atmosphere at 310° C. and determining the Mw molecular weight of the molten sample by GPC after holding the sample molten for 25 minutes.

34. The article of claim 33, wherein the Mw average molecular weight of the copolyester is at least 17,000 or greater.

35. The article of claim 34, wherein said copolyester has the property of having a molecular weight loss of no more than 13% when holding molten for at least 25 minutes.

36. The article of claim 35, wherein said copolyester has the property of having a molecular weight loss of no more than 11%.

37. The article of claim 36, wherein said copolyester has the property of having a molecular weight loss of no more than 9%.

38. The article of claim 1, wherein the copolyester has an off-gas rate of 2.5 µg/g/min or less.

39. The article of claim 38, wherein the off-gas rate is less than 1.5 µg/g/min.

40. The article of claim 38, wherein the off-gas rate is less than 1.25 µg/g/min.

41. The article of claim 1, wherein the copolyester is thermally stable as determined by having a melt viscosity loss property of less than 50%.

42. The article of claim 41, wherein the melt viscosity loss is less than 35%.

43. The article of claim 41, wherein the melt viscosity loss is no more than 30%.

44. The article of any one of claims 1-29, wherein tin atoms are present in the copolyester in an amount of at least 20 ppm and up to 100 ppm, based on the weight of the copolyester.

* * * * *